(12) United States Patent
Yoshida

(10) Patent No.: US 10,698,545 B2
(45) Date of Patent: Jun. 30, 2020

(54) DISPLAY DEVICE WITH POSITION INPUT FUNCTION

(71) Applicant: Sharp Kabushiki Kaisha, Sakai, Osaka (JP)

(72) Inventor: Masahiro Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/172,946

(22) Filed: Oct. 29, 2018

(65) Prior Publication Data

US 2019/0129538 A1 May 2, 2019

(30) Foreign Application Priority Data

Oct. 30, 2017 (JP) .................... 2017-209036

(51) Int. Cl.
*G06F 3/044* (2006.01)
*G02F 1/1343* (2006.01)
*G02F 1/1333* (2006.01)
*G06F 3/047* (2006.01)
*G06F 3/041* (2006.01)

(52) U.S. Cl.
CPC ............ *G06F 3/044* (2013.01); *G02F 1/1343* (2013.01); *G02F 1/13338* (2013.01); *G06F 3/047* (2013.01); *G06F 3/0412* (2013.01); *G06F 3/0448* (2019.05); *G06F 3/04164* (2019.05)

(58) Field of Classification Search
CPC .... G06F 3/044; G06F 3/0412; G06F 3/04164; G06F 3/0448; G06F 3/047; G02F 1/13338; G02F 1/1343
See application file for complete search history.

(56) References Cited

U.S. PATENT DOCUMENTS

| 9,910,530 | B2 | 3/2018 | Aoyama et al. | |
| 2014/0327846 | A1* | 11/2014 | Hata | ........................ G06F 3/041 |
| | | | | 349/12 |
| 2016/0253023 | A1* | 9/2016 | Aoyama | ............... G06F 3/0416 |
| | | | | 345/174 |
| 2017/0003774 | A1* | 1/2017 | Iwata | ...................... B32B 27/06 |
| 2018/0150180 | A1 | 5/2018 | Aoyama et al. | |
| 2018/0150181 | A1 | 5/2018 | Aoyama et al. | |

FOREIGN PATENT DOCUMENTS

WO 2016/136271 A1 9/2016

* cited by examiner

*Primary Examiner* — Mark W Regn
(74) *Attorney, Agent, or Firm* — Keating & Bennett, LLP

(57) ABSTRACT

A display device with a position input function includes pixel electrodes arranged at interval, a position detection wire disposed between the adjacent pixel electrodes and included in a layer different from a layer of the pixel electrodes, a position detection electrode forming a capacitance between the position detection electrode and a positional input body to detect an input position and included in a same layer as the position detection wire and connected to the position detection wire, the position detection electrode overlapping the pixel electrodes and divided into divided position detection electrodes by the position detection wire, and a connection part included in a layer different from the layer of the position detection electrode and the position detection wire while having an insulation film therebetween, the connection part including a portion overlapping a portion of each divided position detection electrode and connected to the divided position detection electrodes.

12 Claims, 17 Drawing Sheets

DISPLAY DEVICE WITH POSITION INPUT FUNCTION

CROSS REFERENCE TO RELATED APPLICATION

This application claims priority from Japanese Patent Application No. 2017-209036 filed on Oct. 30, 2017. The entire contents of the priority application are incorporated herein by reference.

TECHNICAL FIELD

The technology described herein relates to a display device with a position input function.

BACKGROUND

As an example of a display device including a display panel with an in-cell structured touch panel function, the display device described in WO 2016/136271 has been conventionally known. The display panel described in WO 2016/136271 includes a plurality of gate signal lines, a plurality of data signal lines, a plurality of sensor electrode lines, a plurality of pixel electrodes divided into a plurality of groups, and a plurality of common electrodes arranged at the rate of one for the plurality of pixel electrodes included in one group. The plurality of sensor electrode lines overlaps the plurality of data signal lines in a planar view, and the plurality of sensor electrode lines overlap the plurality of common electrodes in a planar view. At least one of the sensor electrode lines is electrically connected to the plurality of common electrodes. At least one each insulation film is formed between the plurality of data signal lines and the plurality of sensor electrode lines, between the plurality of sensor electrode lines and the plurality of common electrodes, and between the plurality of common electrodes and the plurality of pixel electrodes.

SUMMARY

WO 2016/136271 mentioned above describes a configuration in which the common electrodes are disposed on the top of the data signal lines and the pixel electrodes that are included in the same layer via a second insulation film, and the sensor electrode lines are disposed on the top of the common electrodes via a third insulation film. The third insulation film has through holes to connect the sensor electrode lines to the common electrodes. When the third insulation film is arranged on the top of the common electrodes, the distance between the common electrodes and the liquid crystal layer is increased by the third insulation film and thus there is a possibility that the strength of an electric field applied by the common electrodes to the liquid crystal layer will decrease. With regard to this, WO 2016/136271 also describes a configuration in which the third insulation film is selectively provided at the placement positions of the sensor electrode lines such that the third insulation film is not interposed between most of the common electrodes and the liquid crystal layer. According to this configuration, however, a large step is generated in an alignment film that is disposed on the top of the third insulation film and faces the liquid crystal layer. Accordingly, it is difficult to perform an appropriate alignment treatment such as rubbing on the alignment film, which results in contrast reduction.

The technology described herein was made in view of the above circumstances. An object is to solve problems resulting from the arrangement of position detection wires and position detection electrodes.

A display device with a position input function of the technology described herein includes pixel electrodes arranged at an interval, a position detection wire disposed between the pixel electrodes adjacent to each other and included in a layer different from a layer of the pixel electrodes, a position detection electrode forming a capacitance between the position detection electrode and a positional input body performing a positional input and detecting an input position by the positional input body, the position detection electrode being included in a layer same as that of the position detection wire and connected to the position detection wire, and the position detection electrode overlapping the pixel electrodes and being divided into divided position detection electrodes by the position detection wire, and a connection part included in a layer different from the layer of the position detection electrode and the position detection wire while having an insulation film therebetween, the connection part including a portion thereof overlapping a portion of each of the divided position detection electrodes and being connected to the divided position detection electrodes through a contact hole formed in the insulation film.

Accordingly, the position detection electrode forms a capacitance between the position detection electrode and the positional input body making a positional input, and uses a signal supplied by the position detection wire to detect the position of the input made by the positional input body. For example, supplying a reference potential by the position detection wire to the position detection electrode superimposed on the plurality of pixel electrodes on the different layer makes it possible to display an image by using a potential difference between the plurality of pixel electrodes and the position detection electrode. The position detection wire is disposed between the adjacent pixel electrodes on the layer different from the layer of the pixel electrodes, which reduces parasitic capacitances that could be generated between the position detection wire and the pixel electrodes and improve the aperture ratio. The position detection wire and the position detection electrode are disposed on the same layer, which makes it possible to avoid problems that could occur in the case of arranging the position detection wire and the position detection electrode on different layers as in conventional cases. On the other hand, when the position detection wire and the position detection electrode are included in the same layer, the position detection electrode overlapping the pixel electrodes is divided by the position detection wire into the plurality of divided position detection electrodes. In this regard, the divided position detection electrodes are connected by the connection part disposed on the different layer through the contact hole formed in the insulation film, which makes it possible to keep the plurality of divided position detection electrodes at the same potential. Accordingly, the plurality of divided position detection electrodes divided by the position detection wire can act as one position detection electrode.

According to the technology described herein, it is possible to solve problems resulting from the arrangement of the position detection wire and the position detection electrode.

DETAILED DESCRIPTION

First Embodiment

Figure 3:
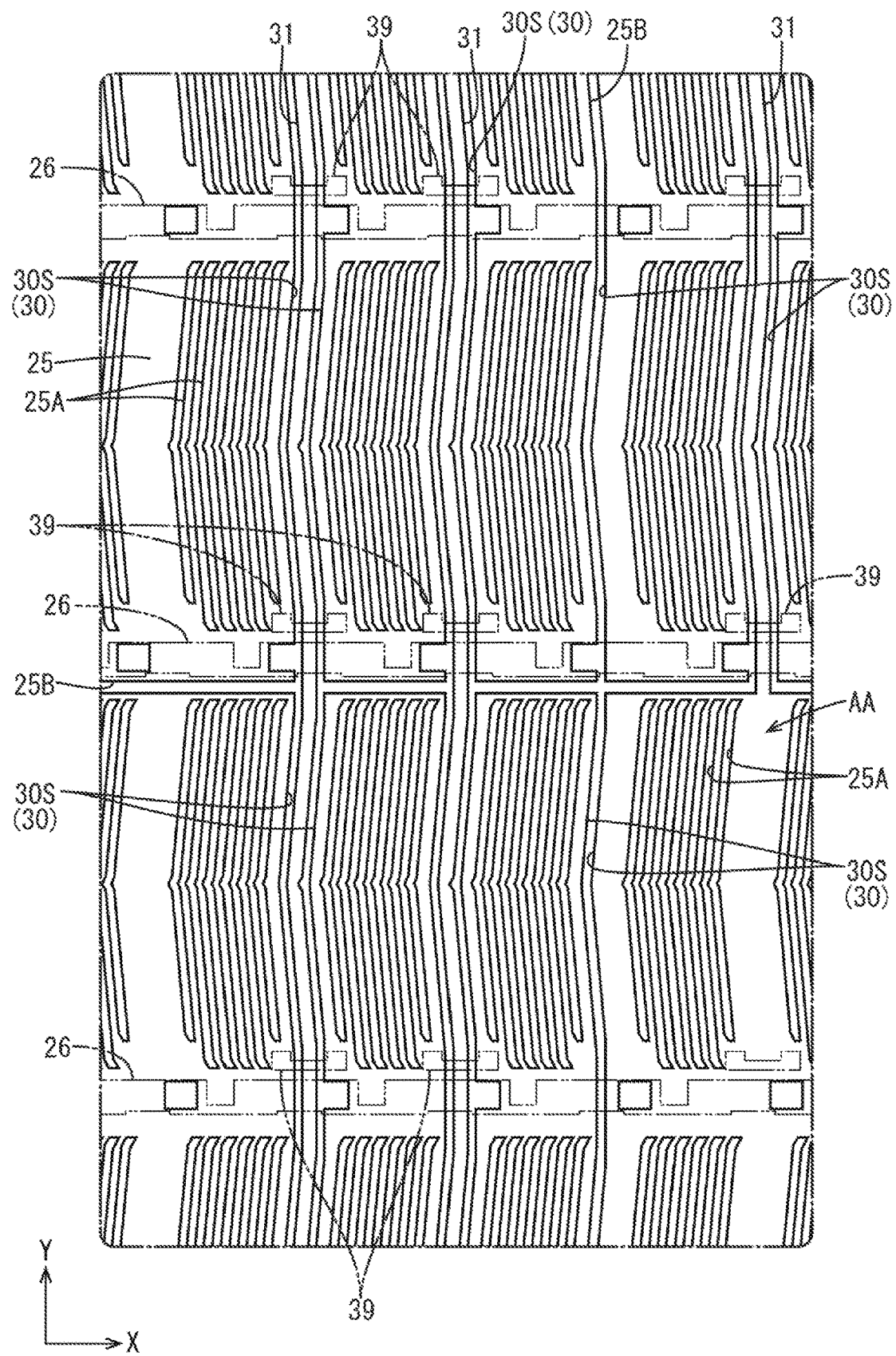
FIG. 3 is a planar view of a pattern of a second transparent electrode film on the array substrate constituting the liquid crystal panel.
Figure 4:
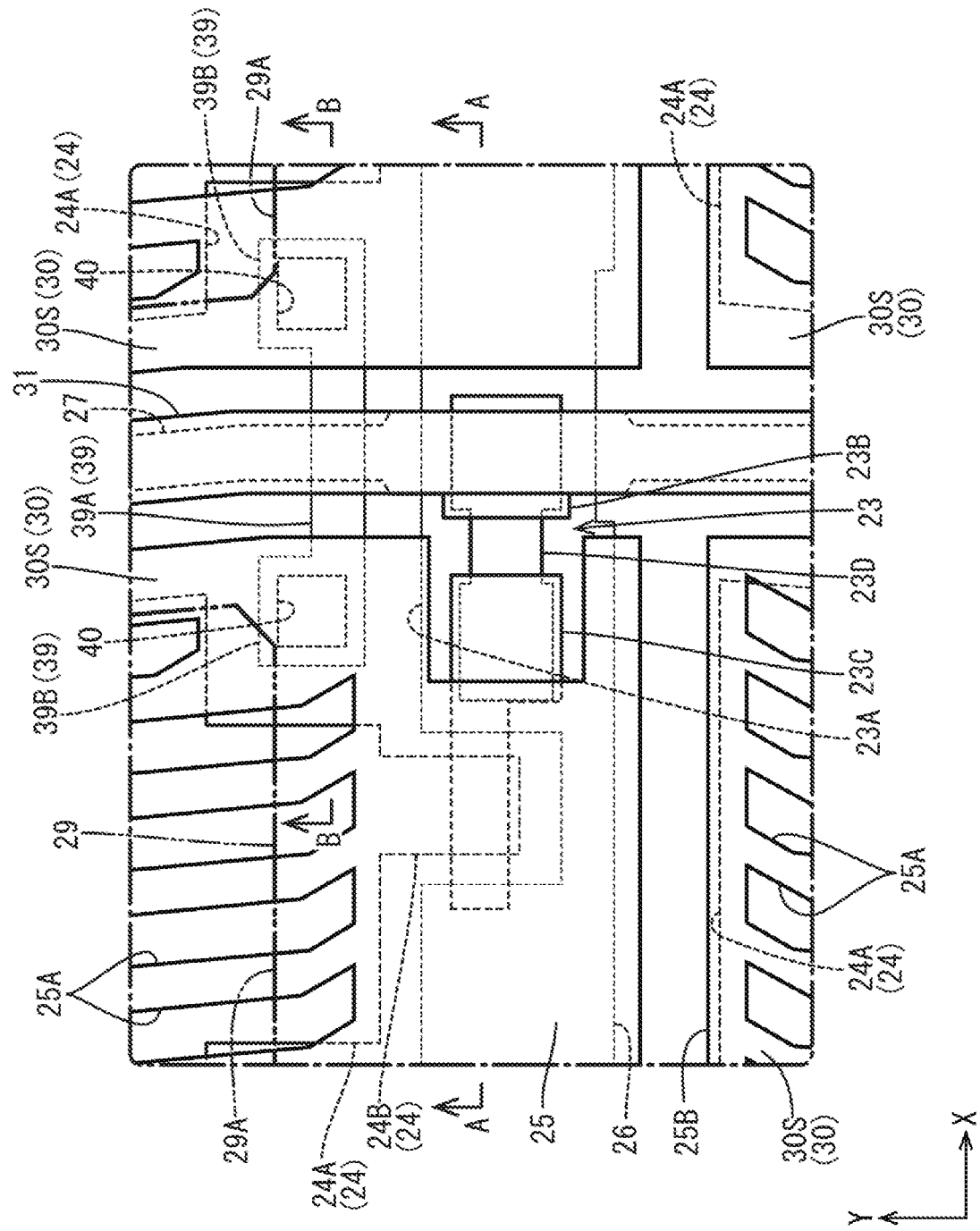
FIG. 4 is an enlarged planar view of a TFT, a connection part, and their surroundings on the array substrate.
Figure 5:
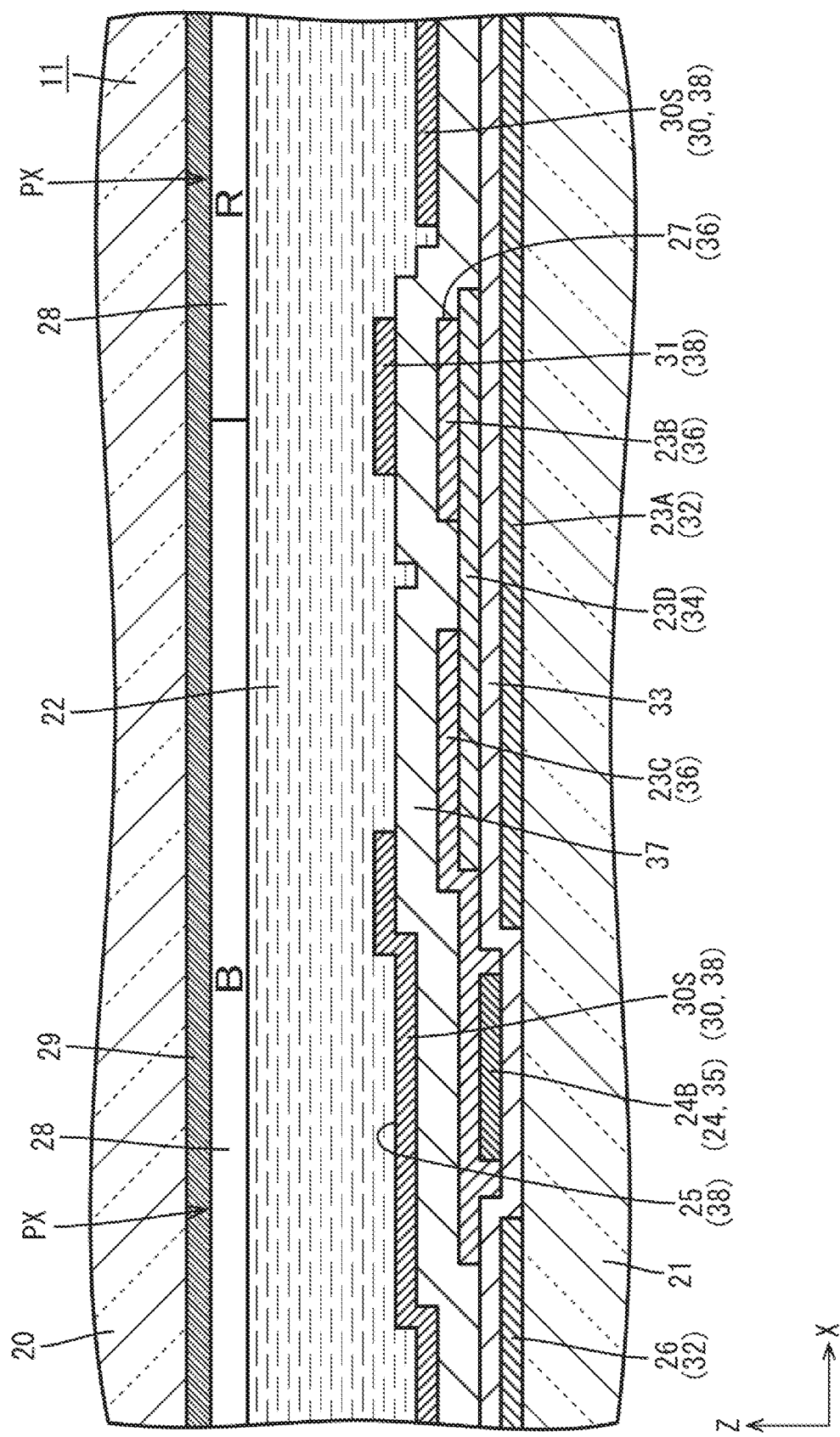
FIG. 5 is a cross-sectional view of the liquid crystal panel illustrated in FIG. 4 taken along line A-A.
Figure 6:
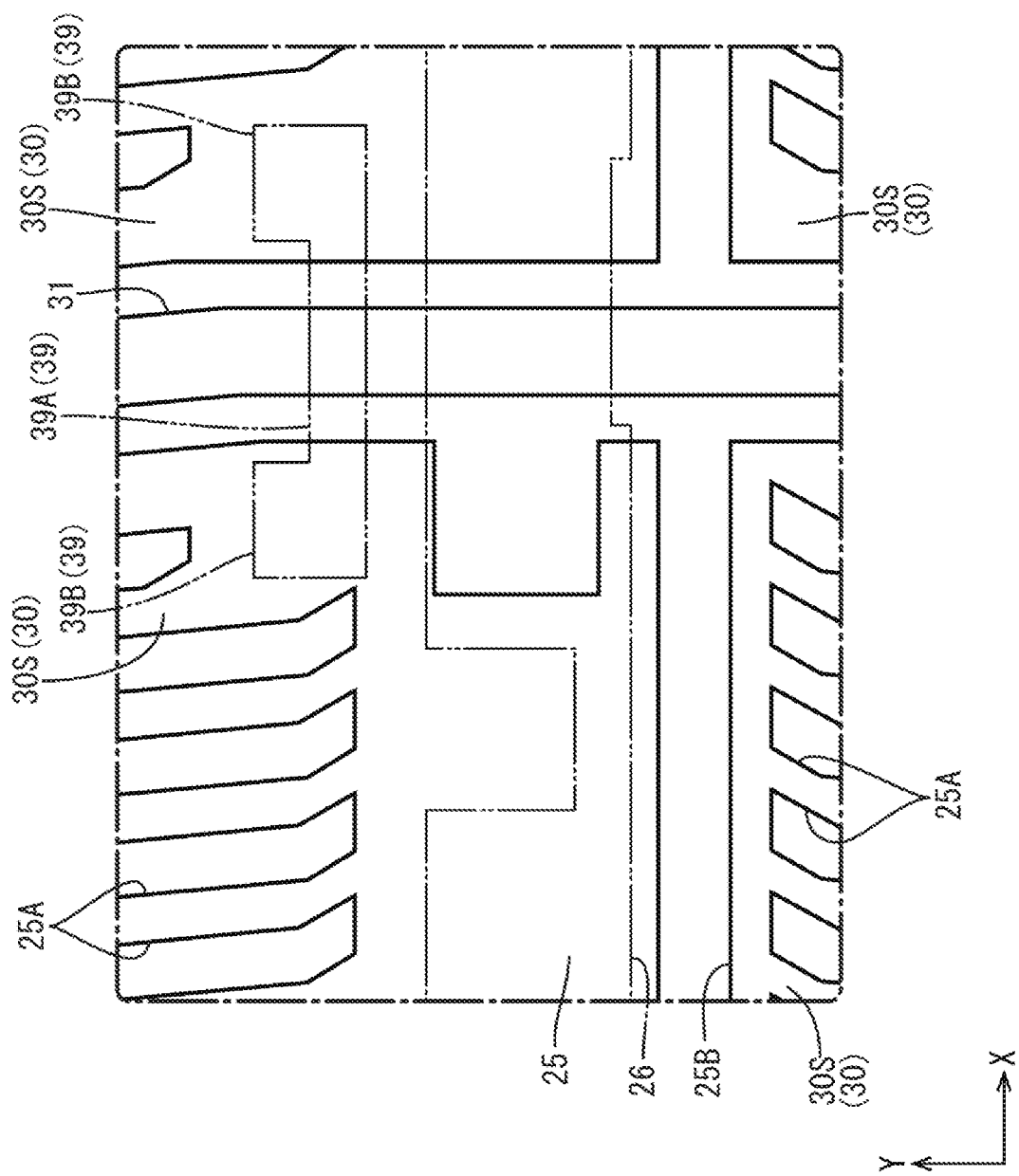
FIG. 6 is an enlarged planar view of the connection part and its surroundings in the pattern of the second transparent electrode film on the array substrate.
Figure 7:
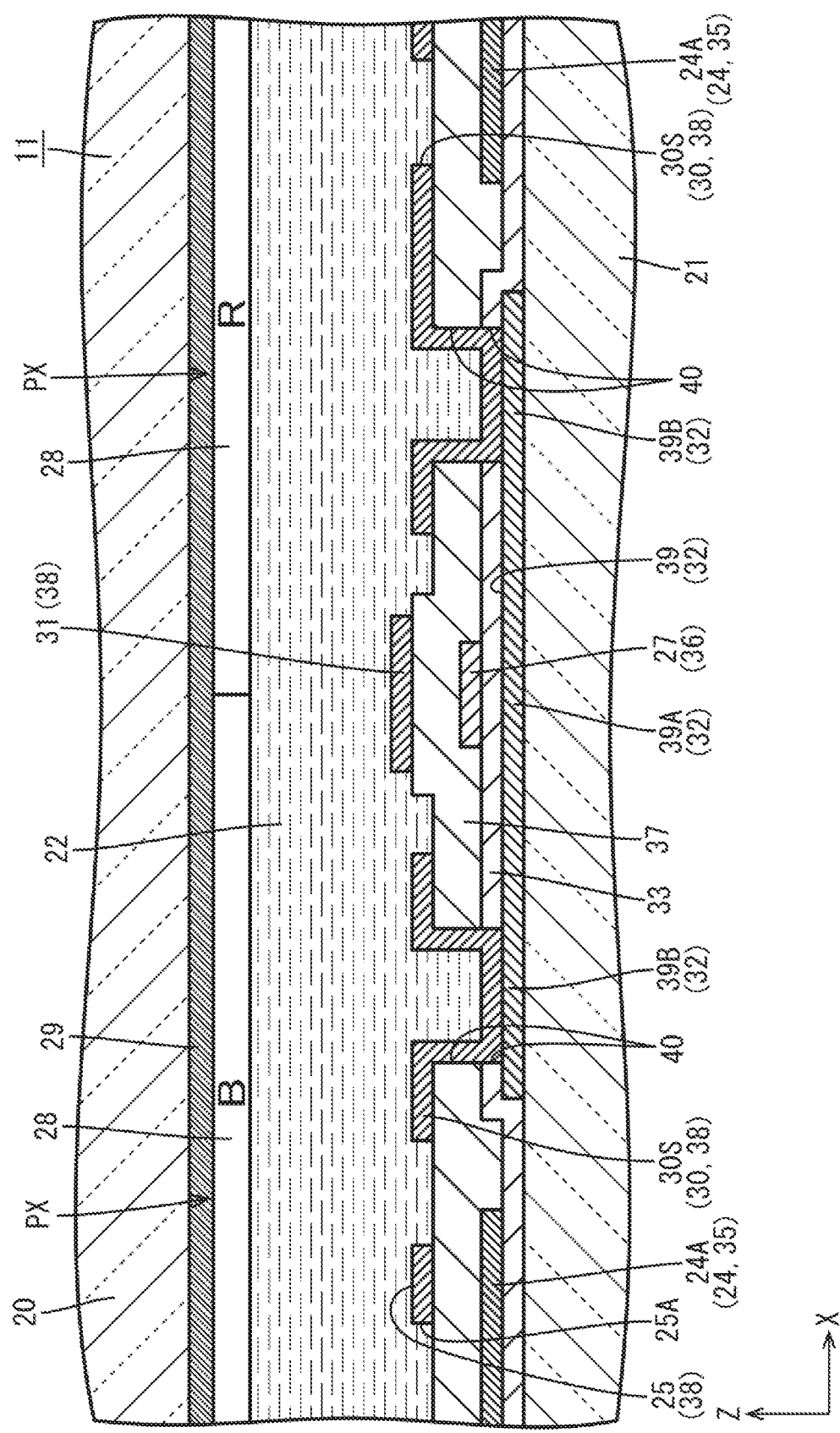
FIG. 7 is a cross-sectional view of the liquid crystal panel illustrated in FIG. 4 taken along line B-B.

A first embodiment of the technology described herein will be described with reference to FIGS. 1 to 7. In the present embodiment, a liquid crystal display device with a touch panel function (positional input function) (a display device with a positional input function) 10 is taken as an example. Some of the drawings indicate an X axis, a Y axis, and a Z axis, and the directions of these axes align with the directions illustrated in the drawings. The upper side of FIGS. 5 and 7 is set to the front side and the lower side of these drawings is set to the back side.

Figure 1:
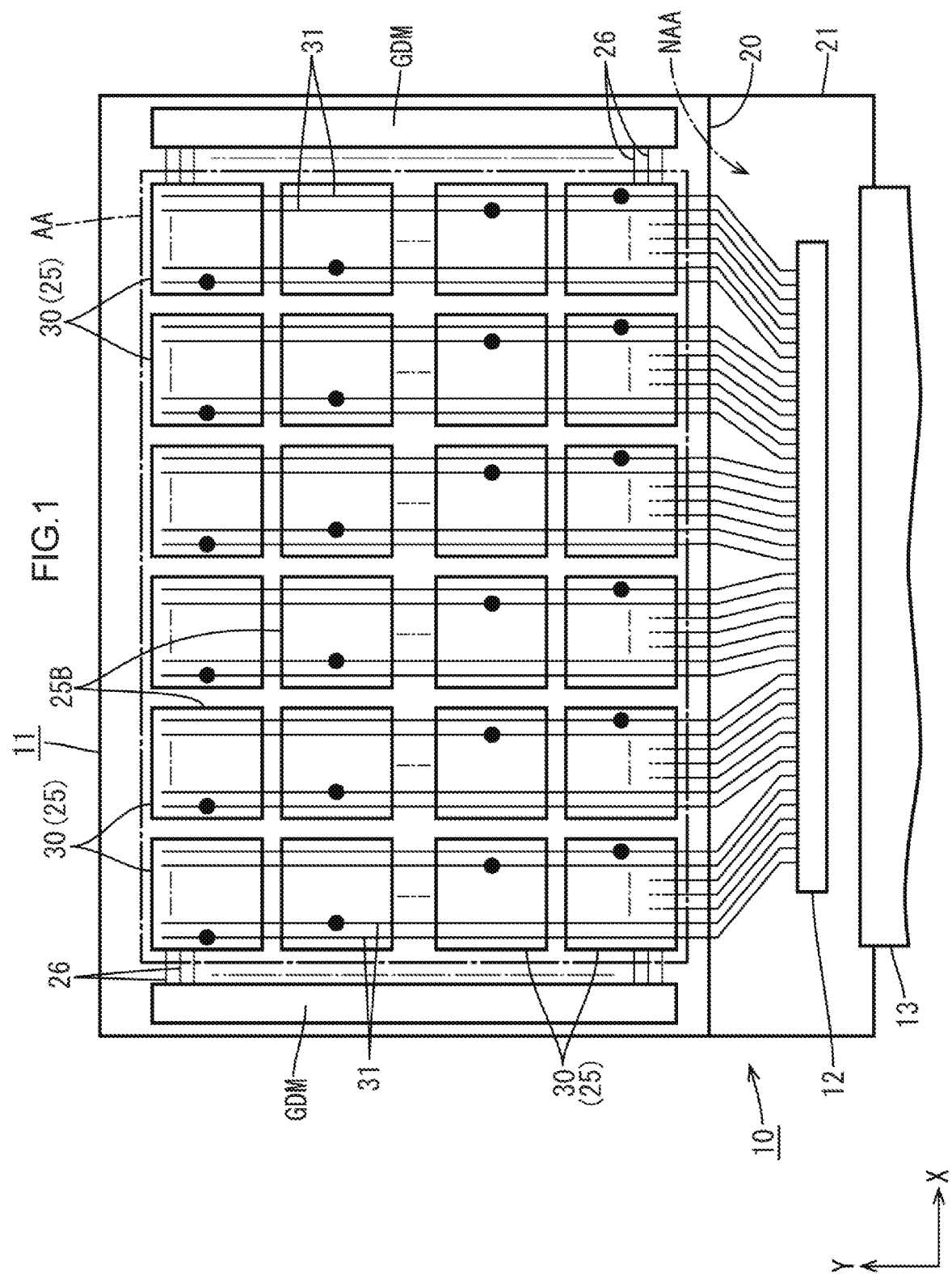
FIG. 1 is a planar view of touch electrodes and touch wires on a liquid crystal panel in a liquid crystal display device according to a first embodiment of the technology described herein.

FIG. 1 is a schematic planar view of a liquid crystal panel 11. As illustrated in FIG. 1, the liquid crystal display device 10 includes at least a liquid crystal panel (display panel) 11 that is horizontally long and is configured to display an image and a backlight unit (illumination unit) that is an external light source irradiating the liquid crystal panel 11 with light for display. In the present embodiment, the liquid crystal panel 11 has a screen size of about 1 to 2 inches, for example, (specifically, 1.45 inches) and a resolution equivalent to "QQVGA". The backlight unit is arranged on the back side (back surface side) of the liquid crystal panel 11 and has a light source (for example, an LED or the like) emitting white light and an optical member that provides an optical action on light from the light source to convert the light into planar light. The backlight unit is not illustrated.

As illustrated in FIG. 1, the liquid crystal panel 11 has the central portion of the screen as a display area where an image is to be displayed (surrounded by one-dot chain lines in FIG. 1) AA and the frame-shaped outer peripheral portion of the screen surrounding the display area AA as a non-display area NAA where no image is to be displayed. The liquid crystal panel 11 is formed by sticking a pair of substrates 20 and 21 to each other. Out of the pair of substrates 20 and 21, a CF substrate (opposing substrate) 20 is on the front side (front surface side) and an array substrate (active matrix substrate, element substrate) 21 is on the back side (back surface side). Each of the CF substrate 20 and the array substrate 21 is formed by stacking various films on the inner surface side of a glass substrate. A polarization plate not illustrated is attached to the outer surfaces of the substrates 20 and 21. The CF substrate 20 has a short side shorter than the short side of the array substrate 21. The CF substrate 20 is bonded to the array substrate 21 such that one end thereof with respect to the short side direction (the Y-axis direction) is aligned with one end of the array substrate 21. Therefore, the other end of the array substrate 21 with respect to the short side direction protrudes sideways with respect to the CF substrate 20. The protruding portion (the non-display area NAA) of the array substrate 21 has a driver (drive circuit unit) 12 and a flexible board (signal transmission unit) 13 for supplying various signals relating to a display function and a touch panel function described later. The driver 12 is formed from an LSI chip having a drive circuit therein and is mounted on the array substrate 21 in a chip-on-glass (COG) manner to process various signals transmitted by the flexible board 13. In the present embodiment, the number of the mounted driver 12 is one. The flexible board 13 is formed such that a large number of wire patterns (not illustrated) are formed on a substrate of an insulating and flexible synthetic resin material (for example, a polyimide resin or the like). The flexible board 13 has one end connected to the non-display area NAA on the liquid crystal panel 11 and the other end connected to a control substrate (signal supply source) not illustrated. The various signals supplied by the control substrate are transmitted to the liquid crystal panel 11 via the flexible board 13, processed by the driver 12 in the non-display area NAA, and output to the display area AA. A pair of gate circuit portions GDM is provided in the non-display area NAA of the array substrate 21 in such a manner as to sandwich the display area AA from the both sides as seen in the X-axis direction. The gate circuit portions GDMs are intended to supply scan signals to gate wires 26 described later.

The liquid crystal panel 11 according to the present embodiment performs the display function to display an image and the touch panel function (positional input function) to detect the position of an input made by the user based on the displayed image. The liquid crystal panel 11 has a touch panel pattern integrated (in-cell structured) for performing the touch panel function. The touch panel pattern is a projection-capacitance type and its detection method is a self-capacitance method. The touch panel pattern is formed from a plurality of touch electrodes (position detection electrodes) 30 arrayed in a matrix on the plate surface of the liquid crystal panel 11 as illustrated in FIG. 1. The touch electrodes 30 are disposed in the display area AA on the liquid crystal panel 11. Therefore, the display area AA on the liquid crystal panel 11 substantially coincides with the touch area (positional input area) where the input position can be detected, and the non-display area NAA substantially coincides with the non-touch area (non-positional input area) where no input position can be detected. When the user puts a finger not illustrated as a conductive body (positional input body) closer to the surface (display surface) of the liquid crystal panel 11 to make a positional input based on the image displayed in the display area AA on the liquid crystal panel 11, capacitances are formed between the finger and the touch electrodes 30. Accordingly, the capacitances detected by the touch electrodes 30 close to the finger change with the approach of the finger and become different from those detected by the touch electrodes 30 distant from the finger. This makes it possible to detect the input position based on the difference. The plurality of touch electrodes 30 are aligned in the display area AA in a matrix with spacing therebetween along an X-axis direction (the alignment direction of pixel electrodes 24 sandwiching touch wire 31) and a Y-axis direction (the extension direction of the touch wires 31). Each of the touch electrodes 30 is formed in the shape of a substantial square with each side of several millimeters (for example, about from 2 mm to 5 mm) in a planar view. Therefore, each of the touch electrodes 30 is much larger than a pixel portion PX described later in a planar view. The touch electrodes 30 are arranged across a plurality of (for example, several tens of or several hundreds of) pixel portions PX as seen in the X-axis direction and the Y-axis direction. The plurality of touch wires (position detection wires) 31 provided on the liquid crystal panel 11 is selectively connected to the plurality of touch electrodes 30. The touch wires 31 extend along the Y-axis direction and are selectively connected to specific ones of the plurality of touch electrodes 30 aligned along the Y-axis direction. FIG. 1 illustrates the connection points of the touch wires 31 to the touch electrodes 30 by black points. The touch wires 31 are further connected to a detection circuit not illustrated. The detection circuit may be included in the driver 12 or may be externally provided on the liquid crystal panel 11 via the flexible board 13. FIG. 1 represents schematically the alignment of the touch electrodes 30. The specific number, arrangement, and planar shape of the touch electrodes 30 can be changed as appropriate from the illustrated ones.

Figure 2:
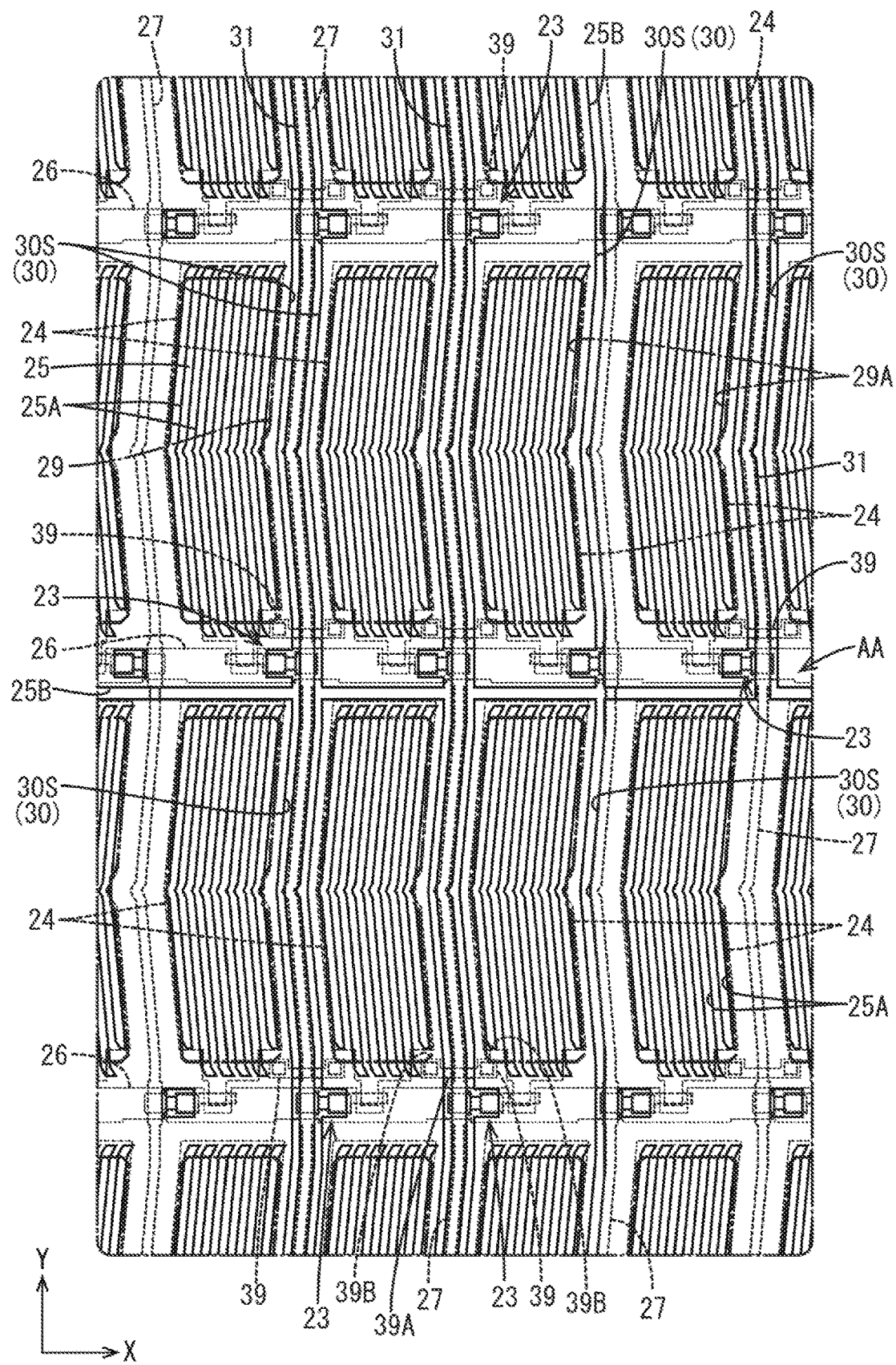
FIG. 2 is a planar view of a pixel array on an array substrate constituting a liquid crystal panel.

FIG. 2 is a planar view of the display area AA on the array substrate 21 constituting the liquid crystal panel 11. On the inner side of the display area AA of the array substrate 21 constituting the liquid crystal panel 11, provided are the thin-film transistors (TFTs, switching elements) 23 and the pixel electrodes 24 as illustrated in FIG. 2. Large numbers of the TFTs 23 and the pixel electrodes 24 are arranged in a matrix (columns and rows) with spacing therebetween along the X-axis direction and the Y-axis direction. Around the TFTs 23 and the pixel electrodes 24, arranged are gate wires (scanning wires) 26 and source wires (signal wires, data wires) 27 orthogonal to each other. The gate wires 26 generally extend along the X-axis direction, whereas the source wires 27 generally extend along the Y-axis direction. The gate wires 26 and the source wires 27 are respectively connected to gate electrodes 23A and source electrodes 23B of the TFTs 23, and the pixel electrodes 24 are connected to drain electrodes 23C of the TFTs 23. The TFTs 23 are driven based on various signals supplied to the gate wires 26 and the source wires 27. Along with the driving, the TFTs 23 control supply of a potential to the pixel electrodes 24. The TFTs 23 are distributed to the right and left sides illustrated in FIG. 2 in the X-axis direction with respect to the pixel electrodes 24. The TFTs 23 distributed to the left side with respect to the pixel electrodes 24 and the TFTs 23 distributed to the right side with respect to the pixel electrodes 24 are alternately and repeatedly arranged in the Y-axis direction in a zigzag (staggered) pattern. The pixel electrodes 24 have the shape of a substantially vertically long square (more specifically, and their long side is bent along the source wires 27). The pixel electrodes 24 have the short side along the extension direction of the gate wires 26 and the long side along the extension direction of the source wires 27. Each of the pixel electrodes 24 is sandwiched between the pair of gate wires 26 from both sides in the Y-axis direction and is sandwiched between the pair of source wires 27 from the both sides in the X-axis direction. The CF substrate 20 has a light-shield portion (inter-pixel light-shield portion, black matrix) 29 illustrated by two-dot chain lines in FIG. 2. The light-shield portion 29 has a substantially grid planar shape that divides the adjacent pixel electrodes 24 and has pixel opening portions 29A at positions overlapping most of the pixel electrodes 24 in a planar view. The pixel opening portions 29A allow transmission light from the pixel electrodes 24 to go outside the liquid crystal panel 11. The light-shield portion 29 is superimposed on at least the gate wires 26 and the source wires 27 (including the touch wires 31) on the array substrate 21 in a planar view. The arrangements of the TFTs 23 and the pixel electrodes 24 will be described later.

Subsequently, a common electrode 25 will be described with reference to FIGS. 2 and 3. FIG. 3 is a planar view of the common electrode 25, the touch electrodes 30, and others on the array substrate 21 constituting the liquid crystal panel 11. On the inner side of the display area AA of the array substrate 21, as illustrated in FIGS. 2 and 3, the common electrode 25 is formed on the top of the pixel electrodes 24 (the front side of the direction of the normal to the plane of the drawing) to cover all the pixel electrodes 24. The common electrode 25 is always supplied with a substantially constant reference potential and extends over substantially the entire display area AA. The common electrode 25 has a plurality of pixel overlapping opening portions (pixel overlapping slits, orientation control slits) 25A along the long side of the pixel electrodes 24 at the positions overlapping the pixel electrodes 24 (specifically, pixel electrode main bodies 24A described later in detail). When a potential difference occurs between the overlapping pixel electrodes 24 and common electrode 25 along with the charging of the pixel electrodes 24, there arises a fringe electric field (oblique electric field) between the opening edges of the pixel overlapping opening portions 25A and the pixel electrodes 24, which includes a component along the plate surface of the array substrate 21 and a component along the direction of the normal to the plate surface of the array substrate 21. Accordingly, the fringe electric field can be used to control the oriented state of the liquid crystal molecules included in a liquid crystal layer 22 described later. That is, the operation mode of the liquid crystal panel 11 according to the present embodiment is a fringe field switching (FFS) mode. The specific number, shape, and formation range of the pixel overlapping opening portions 25A can be changed as appropriate from the ones illustrated in the drawing. The common electrode 25 constitutes the touch electrodes 30. In addition to the pixel overlapping opening portions 25A described above, the common electrode 25 has division opening portions (division slits) 25B that divides the adjacent touch electrodes 30. The division opening portions 25B include portions that run laterally across the entire common electrode 25 along the X-axis direction and portions that vertically run across the entire common electrode 25 along the Y-axis direction. As a whole, the division opening portions 25B form a substantially grid pattern in a planar view. The common electrode 25 is formed from the plurality of touch electrodes 30 that is divided in a lattice form in a planar view by the division opening portions 25B and is electrically independent from one another. Therefore, the touch wires 31 connected to the touch electrodes 30 supply the touch electrodes 30 with a reference potential signal relating to the display function and a touch signal (position detection signal) relating to the touch function at different timings. The reference potential signal is transmitted to all the touch wires 31 at the same timing, so that all the touch electrodes 30 can act as the common electrode 25 at the same reference potential.

A configuration of the TFTs 23 and the pixel electrodes 24 will be described in detail with reference to FIG. 4. FIG. 4 is an enlarged planar view of the TFT 23 and its surroundings on the array substrate 21. As illustrated in FIG. 4, each of the TFTs 23 has a horizontally long shape that extends along the X-axis direction as a whole. Each of the TFTs 23 is adjacent to and arranged under the pixel electrode 24 to be connected as seen in the Y-axis direction. Each of the TFTs 23 has a gate electrode 23A formed from part of the gate wire 26 (overlapping the source wire 27 and others). The gate electrode 23A has a horizontally long shape that extends along the X-axis direction and drives the TFT 23 based on a scanning signal supplied to the gate wire 26 to control the current between the source electrode 23B and the drain electrode 23C. The TFT 23 has a source electrode 23B formed from part of the source wire 27 (overlapping the gate wire 26). The source electrode 23B is disposed on one-end side of the TFT 23 as seen in the X-axis direction, and is substantially entirely overlapped with the gate electrode 23A and connected to a channel portion 23D. Each of the TFTs 23 has a drain electrode 23C at a position spaced from the source electrode 23B, that is, on the other-end side of the TFT 23 as seen in the X-axis direction. The drain electrode 23C generally extends along the X-axis direction. One end of the drain electrode 23C is opposed to the source electrode 23B, overlapped with the gate electrode 23A, and connected to the channel portion 23D. The other end of the drain electrode 23C is connected to the pixel electrode 24.

Each of the pixel electrodes 24 includes, as illustrated in FIG. 4, a substantially square pixel electrode main body 24A that is overlapped with the pixel opening portion 29A of the light-shield portion 29 and a contact portion 24B that protrudes from the pixel electrode main body 24A toward the TFT 23 along the Y-axis direction. The contact portion 24B is connected to the other end of the drain electrode 23C. The gate wire 26 is cut in an area overlapping both the contact portion 24B and the drain electrode 23C. The cut is provided to reduce the capacitance between the gate wire 26 and the pixel electrode 24. The other end of the drain electrode 23C overlaps the gate wire 26. This is intended to, at the time of manufacture of the array substrate 21, even when the drain electrode 23C is displaced with respect to the gate wire 26, avoid fluctuation in the capacitance between the gate wire 26 and the drain electrode 23C (that is, the pixel electrode 24). Each of the TFTs 23 has the channel portion 23D that overlaps the gate electrode 23A via a gate insulation film 33 described later and is connected to the source electrode 23B and the drain electrode 23C. The channel portion 23D overlaps the gate electrode 23A and extends along the X-axis direction. One end of the channel portion 23D is connected to the source electrode 23B, and the other end of the channel portion 23D is connected to the drain electrode 23C. When each of the TFTs 23 is turned on based on a scanning signal supplied to the gate electrode 23A, an image signal (signal, data signal) supplied to the source wire 27 is then supplied from the source electrode 23B to the drain electrode 23C via the channel portion 23D formed from a semiconductor film 34. As a result, the pixel electrodes 24 are charged to the potential based on the image signal. The common electrode 25 is cut in areas overlapping the channel portions 23D. This cut is provided to, when the TFTs 23 are in the off state, suppress fluctuation in the amount of leak current between the source electrodes 23B and the drain electrodes 23C due to fluctuation in the potential of the common electrode 25 (the touch electrodes 30).

FIG. 5 is a cross-sectional view of the TFT 23 and its surroundings on the liquid crystal panel 11. The liquid crystal panel 11 has, as illustrated in FIG. 5, a liquid crystal layer (medium layer) 22 that is disposed between the pair of substrates 20 and 21 and includes liquid crystal molecules as a substance changing in optical characteristics in accordance with application of an electrical application. The liquid crystal layer 22 is surrounded and sealed by a seal portion not illustrated but interposed between the substrates 20 and 21. Three-color filters 28 in blue (B), green (G), and red (R) are provided in the display area AA on the inner side of the CF substrate 20. A large number of different color filters 28 are repeatedly aligned along the gate wires 26 (the X-axis direction). These color filters extend along the source wires 27 (generally in the Y-axis direction) in a stripe pattern as a whole. The color filters 28 overlap the pixel electrodes 24 on the array substrate 21 in a planar view. The different color filters 28 adjacent to each other in the X-axis direction have boundaries (color boundaries) therebetween and overlap the source wires 27 and the light-shield portion 29. In the liquid crystal panel 11, the R, G, and B color filters 28 aligned along the X-axis direction and the three pixel electrodes 24 opposed to the color filters 28 constitute pixel portions PX of three colors. In the liquid crystal panel 11, the pixel portions PX of three colors, R, G, and B adjacent to each other along the X-axis direction constitute display pixels that allow color display with a predetermined gradation. The alignment pitch of the pixel portions PX in the X-axis direction is about 60 μm (specifically, 62 μm) and the alignment pitch of the pixel portions PX in the Y-axis direction is about 180 μm (specifically, 186 μm). The light-shield portions 29 are disposed in such a manner as to divide the adjacent color filters 28. On the top of the color filters 28 (on the liquid crystal layer 22 side), disposed is a flattening film (not illustrated) in a solid manner over substantially the entire area of the CF substrate 20. On the innermost surfaces of the substrates 20 and 21 in contact with the liquid crystal layer 22, formed are an alignment film (not illustrated) for orientation of the liquid crystal molecules included in the liquid crystal layer 22.

The various films formed and stacked on the inner surface side of the array substrate 21 will be described with reference to FIG. 5. On the array substrate 21, as illustrated in FIG. 5, formed and stacked are a first metallic film 32, a gate insulation film 33, a semiconductor film 34, a first transparent electrode film 35, a second metallic film 36, an interlayer insulation film (insulation film) 37, and a second transparent electrode film (transparent electrode film) 38 in this order from the lower side (the glass substrate side). Each of the first metallic film 32 and the second metallic film 36 is a single-layer film formed from one kind of metallic material selected from copper, titanium, aluminum, and tungsten or a stacked film or alloy formed from different kinds of metallic materials, and thus these films possess electrical conductivity and light-shielding properties. The first metallic film 32 forms the gate wires 26, the gate electrodes 23A of the TFTs 23, and others. The second metallic film 36 forms the source wires 27, the source electrodes 23B and the drain electrodes 23C of the TFTs 23, and others. Each of the gate insulation film 33 and the inter-layer insulation film 37 is formed from an inorganic material such as silicon nitride (SiNx) and silicon oxide (SiO$_2$). The gate insulation film 33 keeps the first metallic film 32 on the lower side and the semiconductor film 34, the first transparent electrode film 35, and the second metallic film 36 on the upper side in an insulated condition. The inter-layer insulation film 37 keeps the semiconductor film 34 on the lower side and the first transparent electrode film 35, the second metallic film 36, and the second transparent electrode film 38 on the upper side in an insulated condition. The semiconductor film 34 is a thin film of an oxide semiconductor, amorphous silicon, or the like, and forms the channel portions (semiconductor portions) 23D of the TFTs 23 connected to the source electrodes 23B and the drain electrodes 23C. The first transparent electrode film 35 and the second transparent electrode film 38 are formed from a transparent electrode material (for example, indium tin oxide (ITO) or indium zinc oxide (IZO)). The first transparent electrode film 35 forms the pixel electrodes 24 and others. In the non-formation area of the semiconductor film 34, the first transparent electrode film 35 and the second metallic film 36 are both disposed on the top of the gate insulation film 33 on the same layer. Therefore, it can be said that the pixel electrodes 24 formed from the first transparent electrode film 35 and the source wires 27 and others formed from the second metallic film 36 are disposed on the same layer. The second transparent electrode film 38 forms the common electrode 25 (the touch electrodes 30), the touch wires 31, and others. In the present embodiment, the source electrodes 23B and the drain electrodes 23C have a single-layer structure formed from the second metallic film 36. However, the source electrodes 23B and the drain electrodes 23C may have a stacked structure of the first transparent electrode film 35 and the second metallic film 36, for example.

Subsequently, a configuration of the touch wires 31 will be described in detail mainly with reference to FIGS. 5 and 6 and as appropriate with reference to FIGS. 3 and 4. FIG. 6 is an enlarged planar view of the connection part 39 described later and its surroundings in the pattern of the second transparent electrode film 38 on the array substrate 21. FIGS. 3 and 6 illustrate a pattern of the first metallic film 32 by two-dot chain lines. The touch wires 31 according to the present embodiment are formed from the second transparent electrode film 38, as with the common electrode 25 and the touch electrodes 30, as illustrated in FIGS. 5 and 6. That is, the touch wires 31 are disposed on the layer different from the layer of the pixel electrodes 24 formed from the first transparent electrode film 35, and are disposed on the same layer as the common electrode 25 and the touch electrodes 30. In this way, the touch wires 31 and the touch electrodes 30 are included in the same layer and thus it is possible to avoid problems that would occur when the touch wires and the touch electrodes are included in different layers as in conventional configurations (specifically, the strength of an electric field applied to the liquid crystal layer 22 decreases or there is generated a large step in the alignment film). As illustrated in FIG. 4, the touch wires 31 generally extend along the Y-axis direction and are disposed between the pixel electrodes 24 adjacent to each other in the X-axis direction and do not overlap the pixel electrodes 24.

Therefore, it is possible to reduce the parasitic capacitances that could occur between the touch wires 31 and the pixel electrodes 24 and improve the aperture ratio, as compared to the case where the touch wires overlap some of the pixel electrodes 24. As described above, the touch electrodes 30 disposed on the same layer as the touch wires 31 are formed in such a range and arranged in such a manner as to be overlapped with the plurality of groups of pixel electrodes 24 aligned along the X-axis direction and the Y-axis direction in a planar view as illustrated in FIG. 3. Therefore, the touch electrodes 30 are divided into the plurality of divided touch electrodes 30S by the touch wires 31 interposed between the pixel electrodes 24 adjacent to each other in the X-axis direction. The second transparent electrode film 38 has slits between the touch wires 31 and the divided touch electrodes 30S not to be connected to the touch wires 31. These slits are not formed between the touch wires 31 and the divided touch electrodes 30S to be connected to the touch wires 31. The divided touch electrodes 30S extend along the Y-axis direction (the extension direction of the touch wires 31) and have the same length as the dimension of the touch electrodes 30 as seen in the Y-axis direction. The divided touch electrodes 30S have the width that is substantially equal to the distance between the pair of touch wires 31 sandwiching the divided touch electrode 30S in the X-axis direction. Therefore, the width of the divided touch electrodes 30S varies depending on the arrangement of the touch wires 31 in the X-axis direction. The minimum value of the width of the divided touch electrodes 30S is equal to (more specifically, slightly larger than) the width of the pixel electrodes 24. The number of the divided touch electrodes 30S (divisions) included in one touch electrode 30 is obtained by adding 1 to the number of the touch wires 31 that vertically runs across one touch electrode 30. Each of the divided touch electrodes 30S is opened at a position overlapping the TFT 23.

The touch wires 31 formed from the second transparent electrode film 38 overlap the source wires 27 formed from the second metallic film 36 and disposed in different layers in a planar view as illustrated in FIGS. 4 and 5. In the present embodiment, the number of the touch wires 31 is smaller than the number of the source wires 27. Therefore, all the touch wires 31 overlap the source wires 27, whereas some of the source wires 27 overlap the touch wires 31 and the other of which do not overlap the touch wires 31. In this way, according to the configuration in which the touch wires 31 overlap the source wires 27, the aperture ratio can be favorably improved as compared to the case where none of the source wires overlaps the touch wires 31. In addition, the parasitic capacitances that could occur between one of the pair of pixel electrodes 24 adjacent to each other with the source wire 27 therebetween and the source wires 27 and the parasitic capacitances that could occur between the other of the pixel electrodes 24 and the source wire 27 can be favorably equalized. Accordingly, when signals of reverse polarities are supplied to the pair of source wires 27 sandwiching the pixel electrode 24 from the both side in the X-axis direction, the fluctuation in the potential of the pixel electrodes 24 along with the fluctuation in the potential of one source wire 27 and the fluctuation in the potential of the pixel electrode 24 along with the fluctuation in the potential of the other source wire 27 can be canceled out each other by the parasitic capacitances equal to each other. That is, while the TFTs 23 are in the off state, the fluctuation in the potential of the pixel electrodes 24 is suppressed. This makes degradation of display quality such as shadowing less unlikely to occur.

The array substrate has connection parts (divided touch electrode delay portions) 39, each of which connects the pair of divided touch electrodes 30S sandwiching the touch wire 31 in the X-axis direction (the direction crossing the alignment direction of the pixel electrodes 24 and the extension direction of the touch wires 31) as illustrated in FIGS. 3 and 6. FIG. 7 is a cross-sectional view of the connection part 39 and its surroundings on the liquid crystal panel 11. Hereinafter, a configuration of the connection part 39 will be described mainly with reference to FIGS. 6 and 7 and as appropriate with reference to FIGS. 3 and 4. As illustrated in FIGS. 6 and 7, each of the connection parts 39 is included in a layer different from the layer of the touch electrodes 30 and the touch wires 31 and is partially overlapped with the partial pair of divided touch electrodes 30S sandwiching the touch wire 31. Specifically, the connection parts 39 are formed from the first metallic film 32 that is disposed under the touch electrodes 30 and the touch wires 31 with the gate insulation film (insulation film) 33 and the inter-layer insulation film (insulation film) 37 therebetween. Therefore, although the connection parts 39 are disposed to run laterally across the touch wires 31, it is possible to avoid the connection parts 39 from causing a short-circuit in the touch wires 31. In addition, the connection parts 39 run laterally across the source wires 27 that overlap the touch wires 31 but the gate insulation film (insulation film) 33 is interposed between the connection parts 39 and the second metallic film 36 constituting the source wires 27. Therefore, it is possible to avoid the connection parts 39 from causing a short-circuit in the source wires 27. Contact holes 40 are opened and formed through the gate insulation film 33 and the inter-layer insulation film 37 that are insulation films interposed between the connection parts 39 formed from the first metallic film 32 and the touch electrodes 30 and the touch wires 31 formed from the second transparent electrode film 38. The contact holes 40 are overlapped with both the connection parts 39 and the pairs of divided touch electrodes 30S in the gate insulation film 33 and the inter-layer insulation film 37. Through the contact holes 40, the connection parts 39 and the pairs of divided touch electrodes 30S are electrically connected. Therefore, the plurality of divided touch electrodes 30S formed by arranging the touch wires 31 and the touch electrodes 30 on the same layer can be kept at the same potential by the connection parts 39. Accordingly, the plurality of divided touch electrodes 30S formed with the touch wires 31 therebetween can act as one touch electrode 30.

The connection parts 39 are disposed to connect all the divided touch electrodes 30S that constitute the touch electrodes 30 and are adjacent to each other with the touch wires 31 therebetween as illustrated in FIG. 3. That is, the connection parts 39 are disposed in such a manner as to run laterally across all the touch wires 31 on the array substrate 21. The plurality of connection parts 39 is aligned with spaces therebetween as seen in the Y-axis direction, and the spacing is substantially the same as the spacing between the pixel electrodes 24 as seen in the Y-axis direction. That is, the number of the connection parts 39 aligned in the Y-axis direction is the same as the number of the pixel electrodes 24 (the TFTs 23 and the gate wires 26) aligned in the Y-axis direction. More specifically, as illustrated in FIGS. 4 and 6, each of the connection parts 39 is adjacent to the TFT 23 and the pixel electrode 24 to be connected to the TFT 23 with respect to the gate wire 26 as seen in the Y-axis direction. Each of the connection parts 39 has an extension portion 39A that runs laterally across the touch wire 31 and extends along the X-axis direction and a pair of electrode contact portions 39B that is connected to the pair of divided touch electrodes 30S sandwiching the touch wire 31. The extension portion 39A has a length equal to the space between the pair of pixel electrodes 24 adjacent to each other with the touch wire 31 therebetween and runs laterally across only one touch wire 31. The pair of electrode contact portions 39B is provided at the both ends of the extension portion 39A as seen in the extension direction (the X-axis direction). The pair of electrode contact portions 39B is disposed near the corners of the pair of pixel electrodes 24 adjacent to each other with the touch wire 31 therebetween, which are closer to the touch wire 31. The pair of electrode contact portions 39B has a substantially regular-square planar shape and has one each side longer than the width of the extension portion 39A. The pair of electrode contact portions 39B extends from the extension portion 39A to the side opposite to the TFT 23 and the gate wire 26 as seen in the Y-axis direction. The pair of contact holes 40 is provided for one connection part 39 in such a manner as to be overlapped with the pair of electrode contact portions 39B in a planar view as illustrated in FIGS. 4 and 7.

As described above, a liquid crystal display device (display device with a positional input function) 10 of the present embodiment includes: a plurality of pixel electrodes 24 arranged at an interval; touch wires (position detection wires) 31 that are disposed between the pixel electrodes 24 adjacent to each other and included in a layer different from a layer of the pixel electrodes 24; touch electrodes (position detection electrodes) 30 that forms capacitances between the touch electrodes 30 and a finger as a positional input body making a positional input to detect a position of the input made by the finger as the positional input body, are disposed on the same layer as the touch wires 31, are connected to the touch wires 31, are overlapped with the plurality of pixel electrodes 24, and are divided into a plurality of divided touch electrodes 30S by the touch wires 31; and connection parts 39 that are included in the layer different from the layer of the touch electrodes 30 and the touch wires 31 while having the gate insulation film 33 and the inter-layer insulation film 37 as insulation films therebetween, are at least partially overlapped with at least some of the plurality of divided touch electrodes 30S, and are connected to the plurality of divided touch electrodes (divided position detection electrodes) 30S through the contact holes 40 formed in the gate insulation film 33 and the inter-layer insulation film 37 as insulation films.

Accordingly, the touch electrodes 30 form capacitances between the touch electrodes 30 and the finger as the positional input body making a positional input, and uses signals supplied by the touch wires 31 to detect the position of the input made by the finger as the positional input body. For example, if a reference potential is supplied via the touch wires 31 to the touch electrodes 30 overlapping the plurality of pixel electrodes 24 in the different layers, an image is displayed by using potential differences between the plurality of pixel electrodes 24 and the touch electrodes 30. The touch wires 31 are disposed between the adjacent pixel electrodes 24 in the layer different from the layer of the pixel electrodes 24, which reduces parasitic capacitances that could be generated between the touch wires 31 and the pixel electrodes 24 and improve the aperture ratio. Since the touch wires 31 and the touch electrodes 30 are included in the same layer, problems that could occur in the case of arranging the touch wires and the touch electrodes in different layers as in conventional cases are less likely to be caused. On the other hand, when the touch wires 31 and the touch electrodes 30 are included in the same layer, the touch electrode 30 overlapping the plurality of pixel electrodes 24 is divided by the touch wires 31 into the plurality of divided touch electrodes 30S. In this regard, the plurality of divided touch electrodes 30S is connected by the connection parts 39 included in the different layers through the contact holes 40 that are formed in the gate insulation film 33 and the inter-layer insulation film 37 as insulation films and therefore, the plurality of divided touch electrodes 30S is kept at the same potential. Accordingly, the plurality of divided touch electrodes 30S divided by the touch wires 31 can act as one touch electrode 30.

In addition, the plurality of source wires (signal wires) 27 is included to transmit signals to be supplied to the plurality of pixel electrodes 24. Some of the plurality of source wires 27 overlap the touch wires 31 in the layer different from the layer of the touch wires 31. Accordingly, the aperture ratio can be favorably improved as compared to the configuration where none of the source wires overlaps the touch wires 31. In addition, the parasitic capacitances that could occur between one of the pair of pixel electrodes 24 adjacent to each other with the source wire 27 therebetween and the source wires 27 and the parasitic capacitances that could occur between the other of the pixel electrodes 24 and the source wire 27 can be favorably equalized.

The source wires 27 are included in the same layer as the pixel electrodes 24. This achieves reduction in manufacturing cost as compared to the configuration where the source wires are included in a layer different from the layer of the pixel electrodes 24.

The connection parts 39 are included in the layer different from the layer of the source wires 27 in such a manner as to cross the source wires 27. If the connection parts are included in the same layer as the source wires 27, the connection parts 39 need to be arranged so as not to cross the source wires 27. This may cause complexity in the shapes of the touch wires 31, the divided touch electrodes 30S, and the source wires 27. In this regard, the connection parts 39 are included in the layer different from the layer of the source wires 27 in such a manner as to cross the source wires 27 and accordingly, the shapes of the touch wires 31, the divided touch electrodes 30S, and the source wires 27 are less likely to be complicated.

In addition, the TFTs 23 are connected to the source wires 27 and the pixel electrodes 24, and the gate wires 26 are connected to the TFTs 23 to transmit signals for driving the TFTs 23 and are included in the layer different from the layer of the source wires 27. The connection parts 39 are included in the same layer as the gate wires 26. Accordingly, the TFTs 23 are driven based on the signals transmitted to the scanning signal. Thus, the signals transmitted to the source wires 27 are supplied to the pixel electrodes 24, so that the pixel electrodes 24 are charged at a predetermined potential. The gate wires 26 are included in the layer different from the layer of the source wires 27, which prevents the occurrence of a short circuit between the gate wires 26 and the source wires 27 even though the gate wires 26 cross the source wires 27. In addition, the connection parts 39 are included in the same layer as the gate wires 26, which achieves reduction in manufacturing cost as compared to the configuration where the connection parts are included in a layer different from the layer of the gate wires 26.

Second Embodiment

A second embodiment of the technology described herein will be described with reference to FIG. 8 or 9. In the second embodiment, connection parts 139 are modified in configuration. Duplicated descriptions of the same structures, operations, and effects as those of the first embodiment will be omitted.

Figure 8:
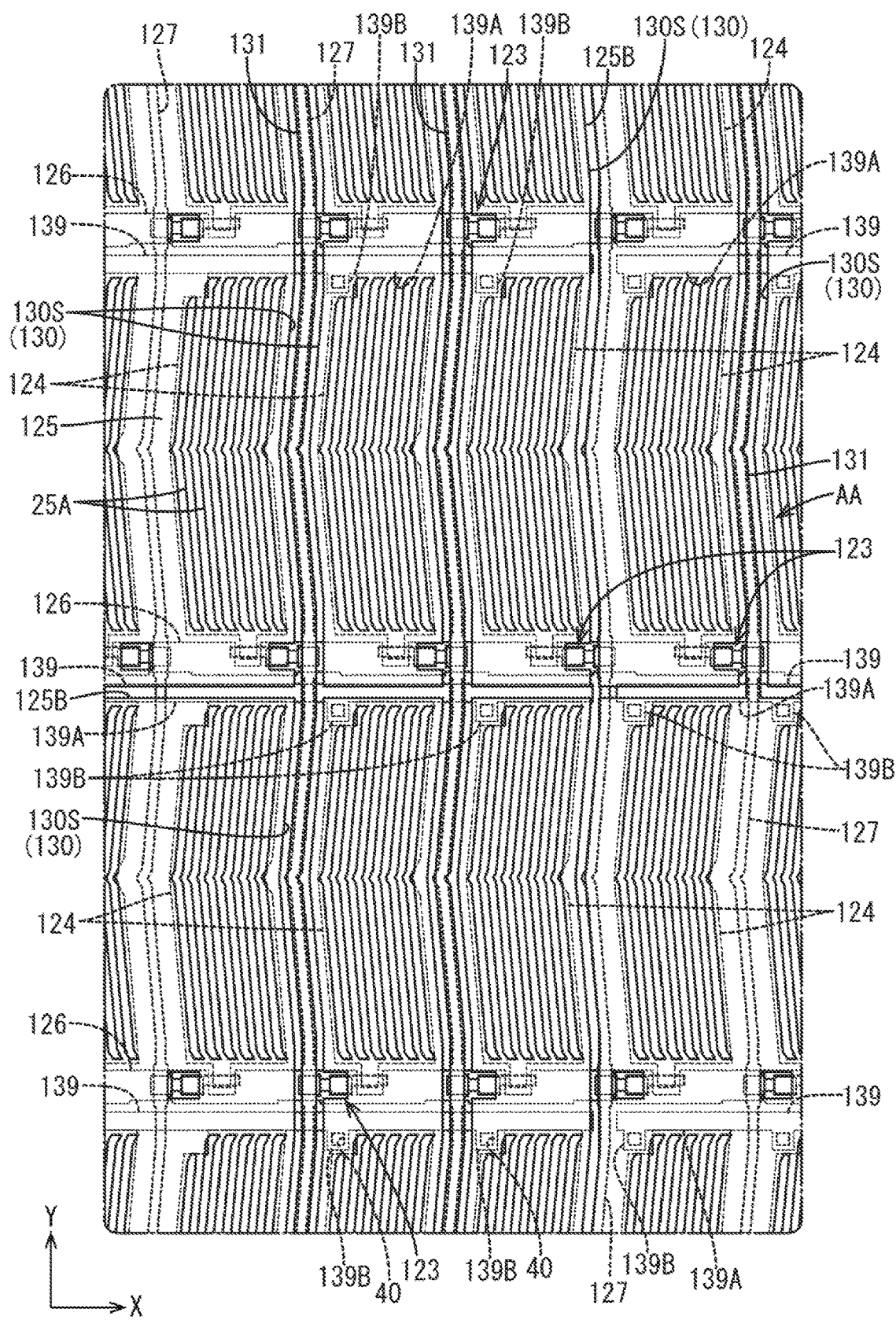
FIG. 8 is a planar view of a pixel array in an array substrate constituting a liquid crystal panel according to a second embodiment of the technology described herein.
Figure 9:
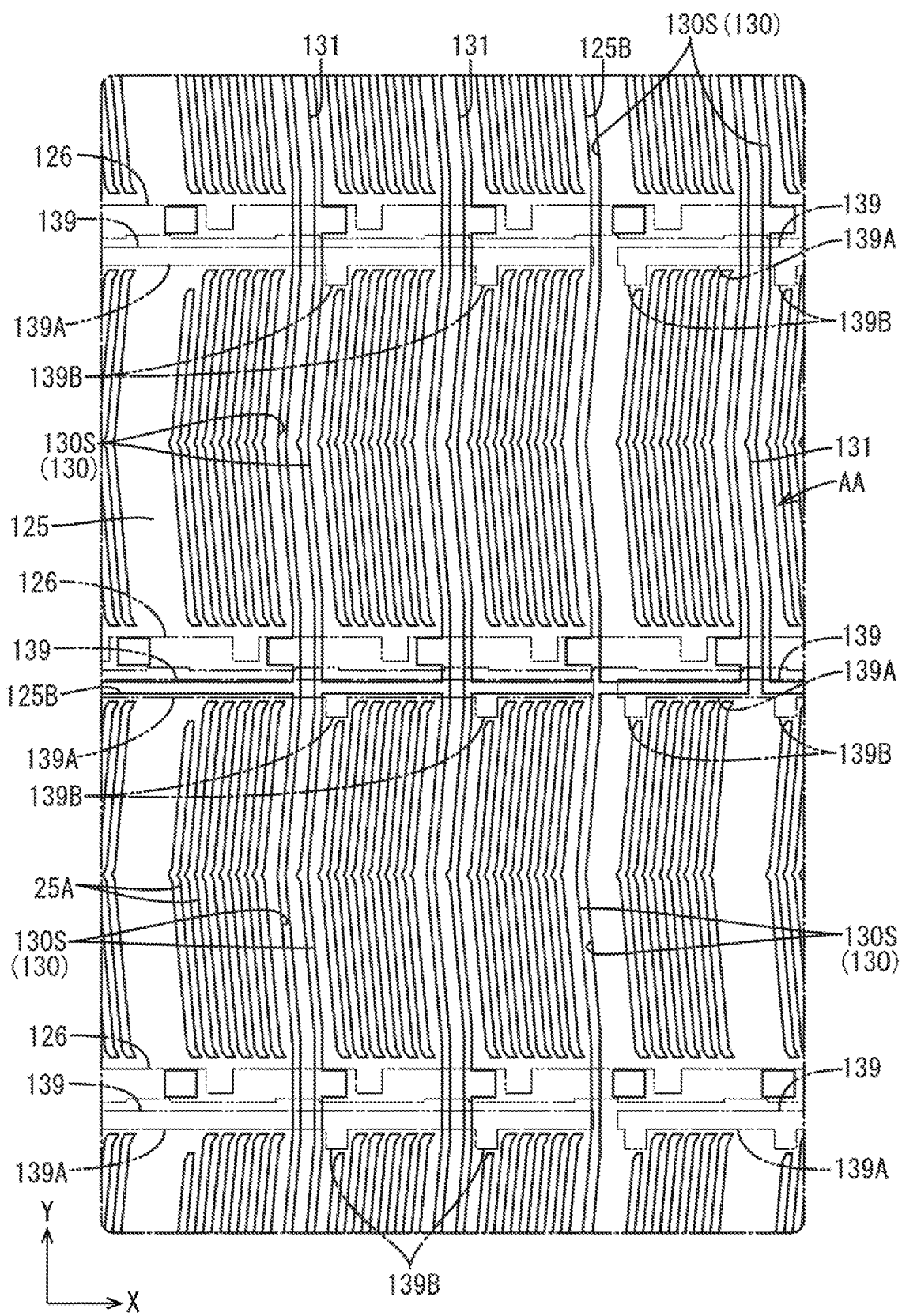
FIG. 9 is a planar view of a pattern of a second transparent electrode film on the array substrate constituting the liquid crystal panel.

FIG. 8 is a planar view of a display area AA on an array substrate, and FIG. 9 is a planar view of a pattern of a second transparent electrode film on the array substrate. The connection parts 139 according to the present embodiment extend such that extension portions 139A cross pluralities of touch wires 131 and source wires 127 as illustrated in FIGS. 8 and 9. More specifically, the connection parts 139 extend in such a manner as to run laterally across substantially the entire touch electrode 130 in the X-axis direction (crossing the extension direction of divided touch electrodes 130S). The length of the extension portions 139A is substantially equal to the dimension of the touch electrode 130 in the X-axis direction. In the connection parts 139, a plurality of (three or more) electrode contact portions 139B is provided on the extension portions 139A having the length described above. The number of the electrode contact portions 139B in the connection parts 139 is equal to the number of the divided touch electrodes 130S across which the extension portions 139A run laterally, that is, the number of the divided touch electrodes 130S in the touch electrode 130. Accordingly, all the divided touch electrodes 130S constituting the touch electrode 130 in the formation range across the plurality of source wires 127 can be connected by one connection part 139. Each of the connection parts 139 is adjacent to the side opposite to the TFT 123 and the pixel electrode 124 to be connected to the TFT 123 with respect to the gate wire 126 as seen in the Y-axis direction. Each of the electrode contact portions 139B protrudes from the extension portion 139A to the side opposite to the TFT 123 and the gate wire 126 as seen in the Y-axis direction. The plurality of connection parts 139 is aligned with spaces therebetween similar to the spaces between the pixel electrodes 124 as seen in the Y-axis direction.

In addition, some of the plurality of connection parts 139 aligned in the Y-axis direction include the extension portions 139A disposed between the touch electrodes 130 adjacent to each other in the Y-axis direction (the extension direction of the touch wires 131). In a planar view, those connection parts 139 overlap portions of division openings 125B extending in the X-axis direction and the division openings 125B divide a common electrode 125 into the plurality of touch electrodes 130. In this case, an electric field between the gate wires 126 and the pixel electrodes 124 is likely to pass through a gap between the touch electrodes 130 adjacent to each other in the Y-axis direction. If the electric field between the gate wire 126 and the pixel electrode 124 is applied to the liquid crystal layer, which is not illustrated in the present embodiment, the orientation of the liquid crystal molecules may be disturbed to cause deterioration in the display performance. In this regard, the extension portions 139A of the connection parts 139 are disposed between the touch electrodes 130 adjacent to each other in the Y-axis direction as described above, thereby making it possible to block the electric field between the gate wires 126 and the pixel electrodes 124 by the extension portions 139A. Accordingly, the orientation of the liquid crystal molecules in the liquid crystal layer is unlikely to be disturbed, thereby suppressing deterioration in the display performance. In addition, in the connection parts 139, the extension portions 139A disposed between the touch electrodes 130 adjacent to each other in the Y-axis direction extend crossing the plurality of source wires 127. Accordingly, the extension portions 139A can continuously block the electric field between the gate wires 126 and the pixel electrodes 124 in an area crossing the plurality of source wires 127. Therefore, deterioration in the display performance is less likely to be caused in a more favorable manner. Further, the connection parts 139 are included in the same layer as the gate wires 126 such that the extension portions 139A are interposed between the TFTs 123 and the gate wires 126 and the pixel electrodes 124 on the opposite side from the pixel electrodes 124 that are to be connected to the TFTs 123 with respect to the Y-axis direction. Accordingly, it is possible to block the electric field between the gate wires 126 and the pixel electrodes 124 by the extension portions 139A in a more favorable manner.

As described above, according to the present embodiment, the TFTs (switching elements) 123 are connected to the source wires 127 and the pixel electrodes 124, and the gate wires (scanning wires) 126 are connected to the TFTs 123 to transmit signals for driving the TFTs 123 and are disposed on the layer different from the layer of the source wires 127. The plurality of touch electrodes 130 are arranged at intervals at least along the extension direction of the touch wires 131. The connection parts 139 have the extension portions 139A that extend along the direction crossing the extension direction of the touch wires 131 and are disposed between the touch electrodes 130 adjacent to each other. Accordingly, the TFTs 123 are driven based on the signals transmitted to the scanning signals. Thus, the signals transmitted to the source wires 127 are supplied to the pixel electrodes 124, so that the pixel electrodes 124 are charged at a predetermined potential. The gate wires 126 are included in the layer different from the layer of the source wires 127 and therefore, a short circuit is less likely to be caused between the gate wires 126 and the source wires 127 even though the gate wires 126 cross the source wires 127. In this case, an electric field between the gate wires 126 and the pixel electrodes 124 is likely to pass through a gap between the touch electrodes 130 adjacent to each other. Therefore, the display performance may be deteriorated by the electric field. In this regard, the connection parts 139 have the extension portions 139A that extend along the direction crossing the extension direction of the touch wires 131 and are disposed between the touch electrodes 130 adjacent to each other. Accordingly, it is possible to block the electric field between the gate wires 126 and the pixel electrodes 124 by the extension portions 139A. This suppresses deterioration in the display performance.

The touch electrode 130 has a formation range across the plurality of source wires 127. The connection parts 139 are included in the layer different from the layer of the source wires 127 and extends such that the extension portions 139A crosses the plurality of source wires 127. Accordingly, the extension portions 139A are disposed between the touch electrodes 130 adjacent to each other in such a manner as to cross the plurality of source wires 127, thereby making it possible to block continuously the electric field between the gate wires 126 and the pixel electrodes 124 by the extension portions 139A. Accordingly, the display performance is less likely to be deteriorated in a more favorable manner. In addition, the plurality of divided touch electrodes 130S constituting the touch electrode 130 in the formation range across the plurality of source wires 127 can be connected by one connection part 139.

The connection parts 139 are included in the same layer as the gate wires 126 such that the extension portions 139A are interposed between the gate wires 126 and the pixel electrodes 124. Accordingly, the extension portions 139A interposed between the gate wires 126 and the pixel electrodes 124 can block the electric field between the gate wires 126 and the pixel electrodes 124 in a more favorable manner. In addition, since the connection parts 139 are included in the same layer as the gate wires 126, a manufacturing cost is reduced as compared to the configuration including the connection parts in a layer different from the layer of the gate wires 126.

Third Embodiment

A third embodiment of the technology described herein will be described with reference to FIGS. 10 to 14. In the third embodiment, the layer on which connection parts 239 are placed is different from that in the first embodiment. Duplicated descriptions of the same structures, operations, and effects as those of the first embodiment will be omitted.

Figure 10:
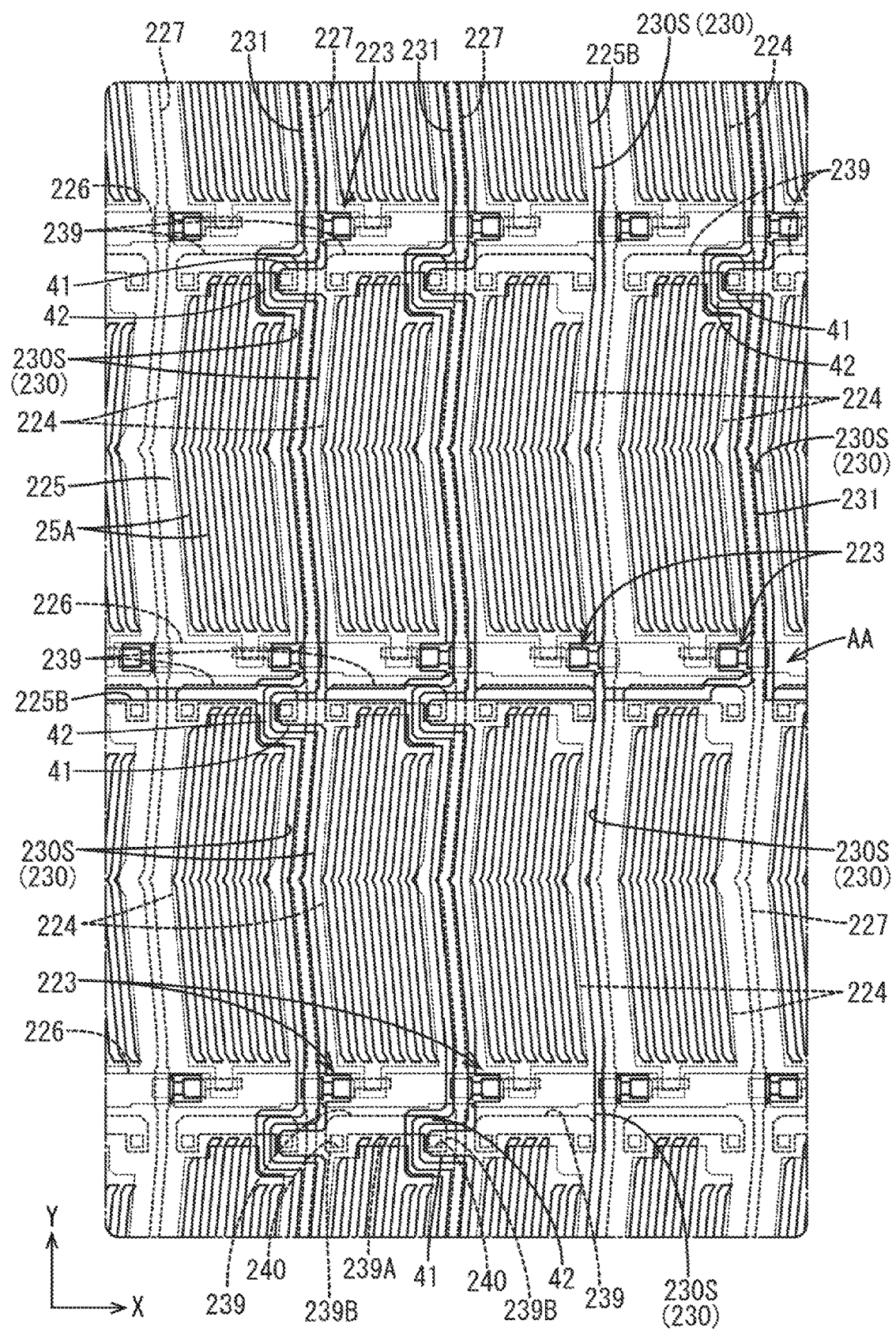
FIG. 10 is a planar view of a pixel array in an array substrate constituting a liquid crystal panel according to a third embodiment of the technology described herein.
Figure 11:
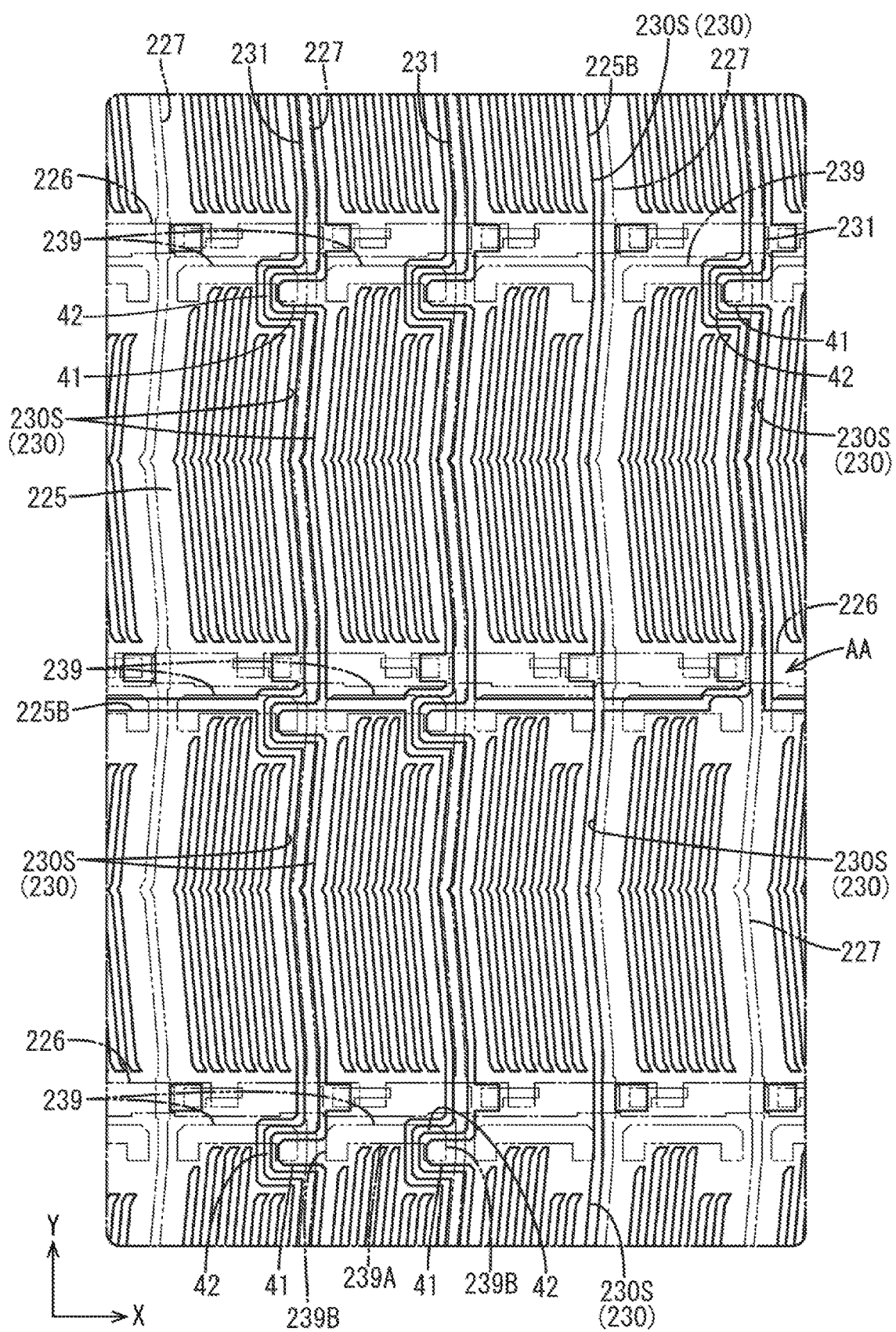
FIG. 11 is a planar view of a pattern of a second transparent electrode film on the array substrate constituting the liquid crystal panel.

FIG. 10 is a planar view of a display area AA on an array substrate 221, and FIG. 11 is a planar view of a pattern of a second transparent electrode film 238 on the array substrate 221. FIG. 11 illustrates patterns of a first metallic film 232 and a second metallic film 236 by two-dot chain lines. Connection parts 239 according to the present embodiment are formed from the second metallic film 236 and are disposed on the same layer as source wires 227 as illustrated in FIGS. 10 and 11. Accordingly, to avoid a short-circuit between the connection parts 239 and the source wires 227, the connection parts 239 are arranged so as not to cross the source wires 227 (not to run laterally across the source wires 227). In the connection parts 239, the length of extension portions 239A is substantially equal to the width of pixel electrodes 224. It can be said that the connection parts 239 formed from the second metallic film 236 similar to the source wires 227 is included in the layer different from the layer of gate wires 226 formed from the first metallic film 232. Therefore, even when the connection parts 239 are arranged in proximity to the gate wires 226, for example, the connection parts 239 do not cause a short circuit with the gate wires 226. Accordingly, the flexibility of arrangement of the connection parts 239 is increased as compared to the configuration including the connection parts in the same layer as the gate wires 226 as in the first and second embodiments. Each of the connection parts 239 is adjacent to the side opposite to the TFT 223 and the pixel electrode 224 to be connected to the TFT 223 with respect to the gate wire 226 with respect to the Y-axis direction. In each of the connection parts 239, a pair of electrode contact portions 239B protrudes from an extension portion 239A to the side opposite to the TFT 223 and the gate wire 226 with respect to the Y-axis direction.

In addition, as in the second embodiment, some of the plurality of connection parts 239 arranged in the Y-axis direction include the extension portions 239A disposed between touch electrodes 230 adjacent to each other in the Y-axis direction (the extension direction of the touch wires 231) as illustrated in FIGS. 10 and 11. In a planar view, those connection parts 239 overlap portions of division openings 225B that divide a common electrode 225 into the plurality of touch electrodes 230, and the portions extending along the X-axis direction. Accordingly, the electric field generated between the gate wires 226 and the pixel electrodes 224 is blocked by the extension portions 239A of the connection parts 239. Accordingly, the orientation of the liquid crystal molecules in a liquid crystal layer 222 (see FIG. 14 described later) is unlikely to be disturbed, thereby suppressing deterioration in the display performance.

Figure 12:
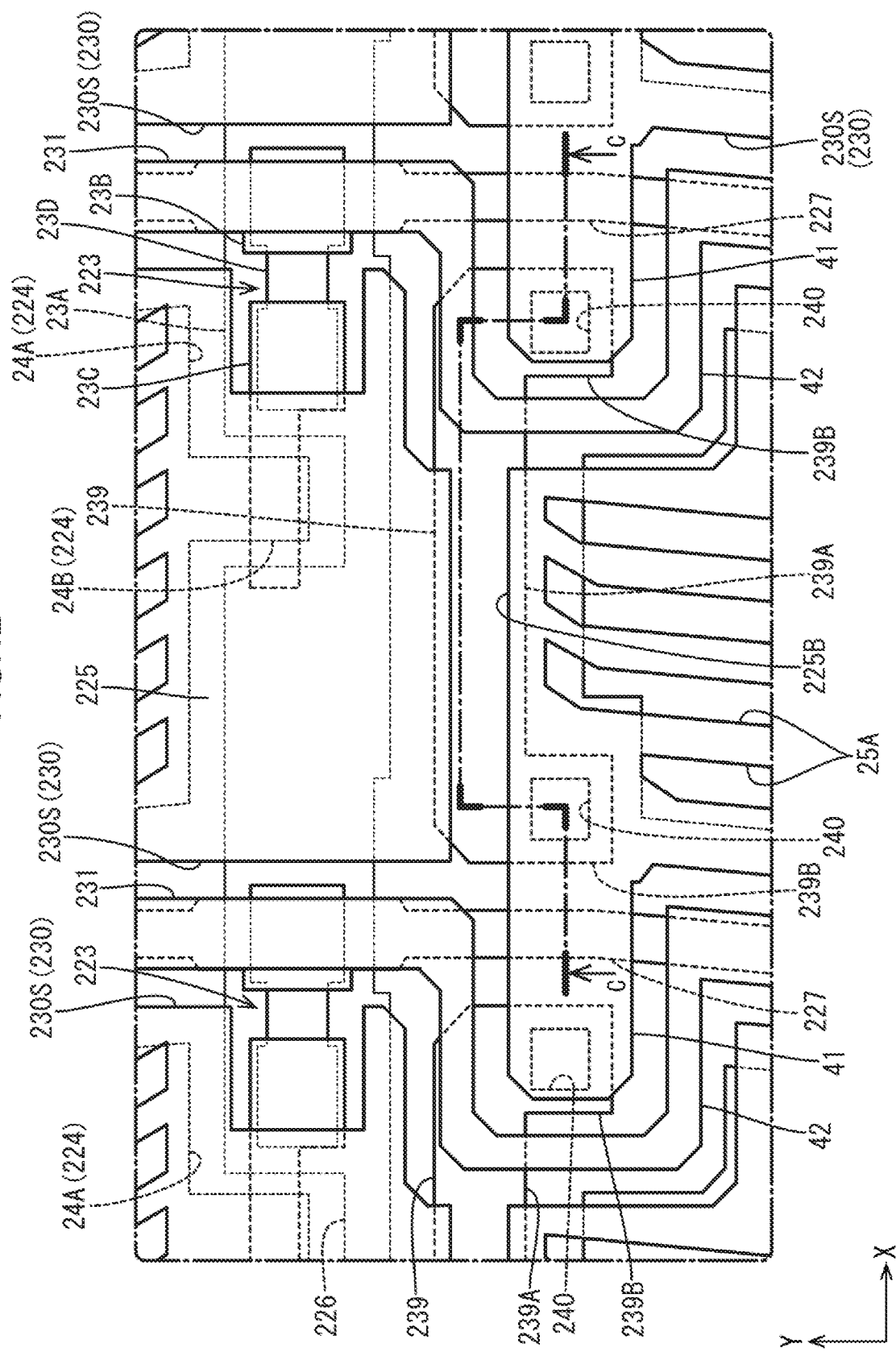
FIG. 12 is an enlarged planar view of a TFT, a connection part, and their surroundings on the array substrate.
Figure 13:
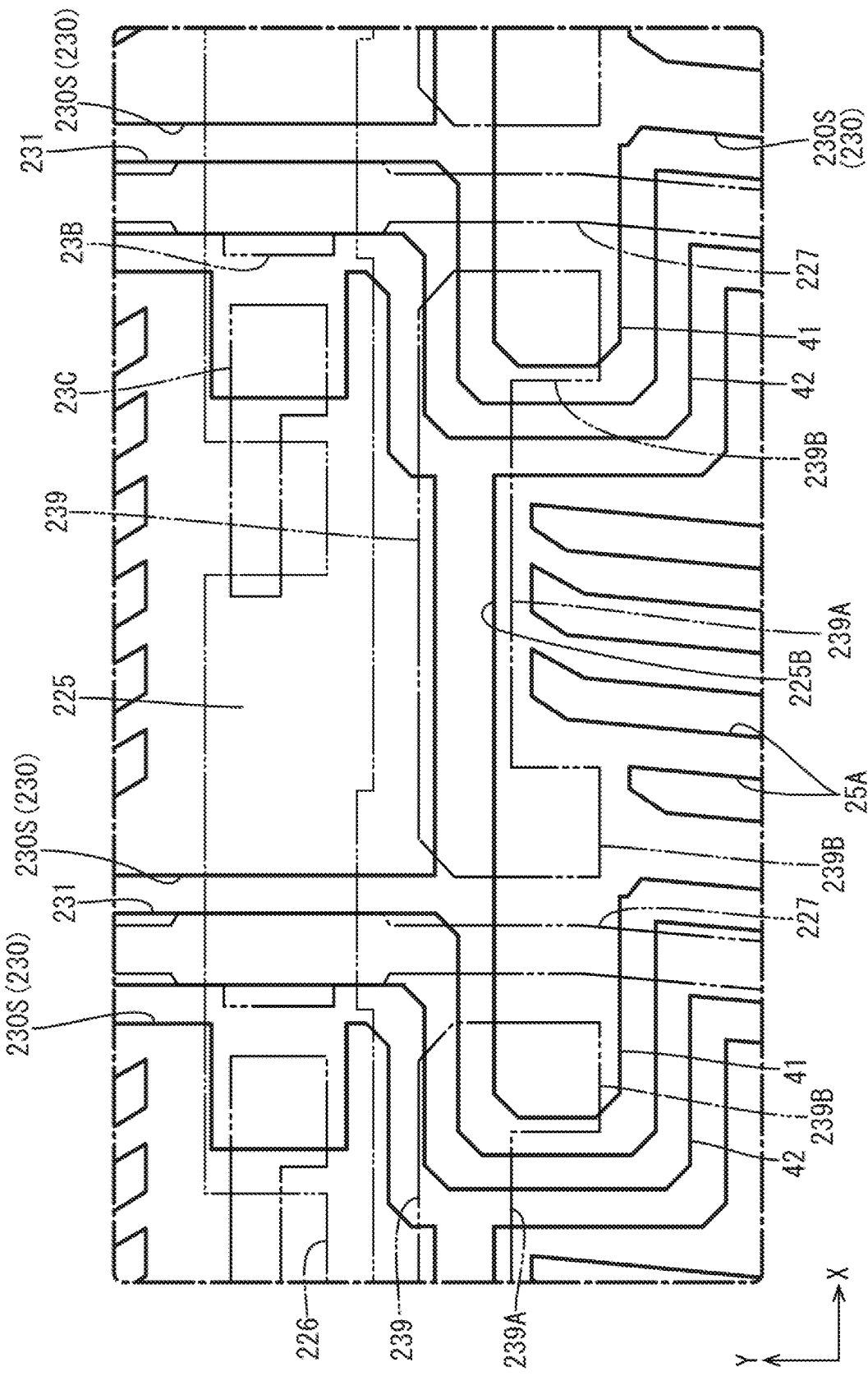
FIG. 13 is an enlarged planar view of the connection part and its surroundings in the pattern of the second transparent electrode film on the array substrate.
Figure 14:
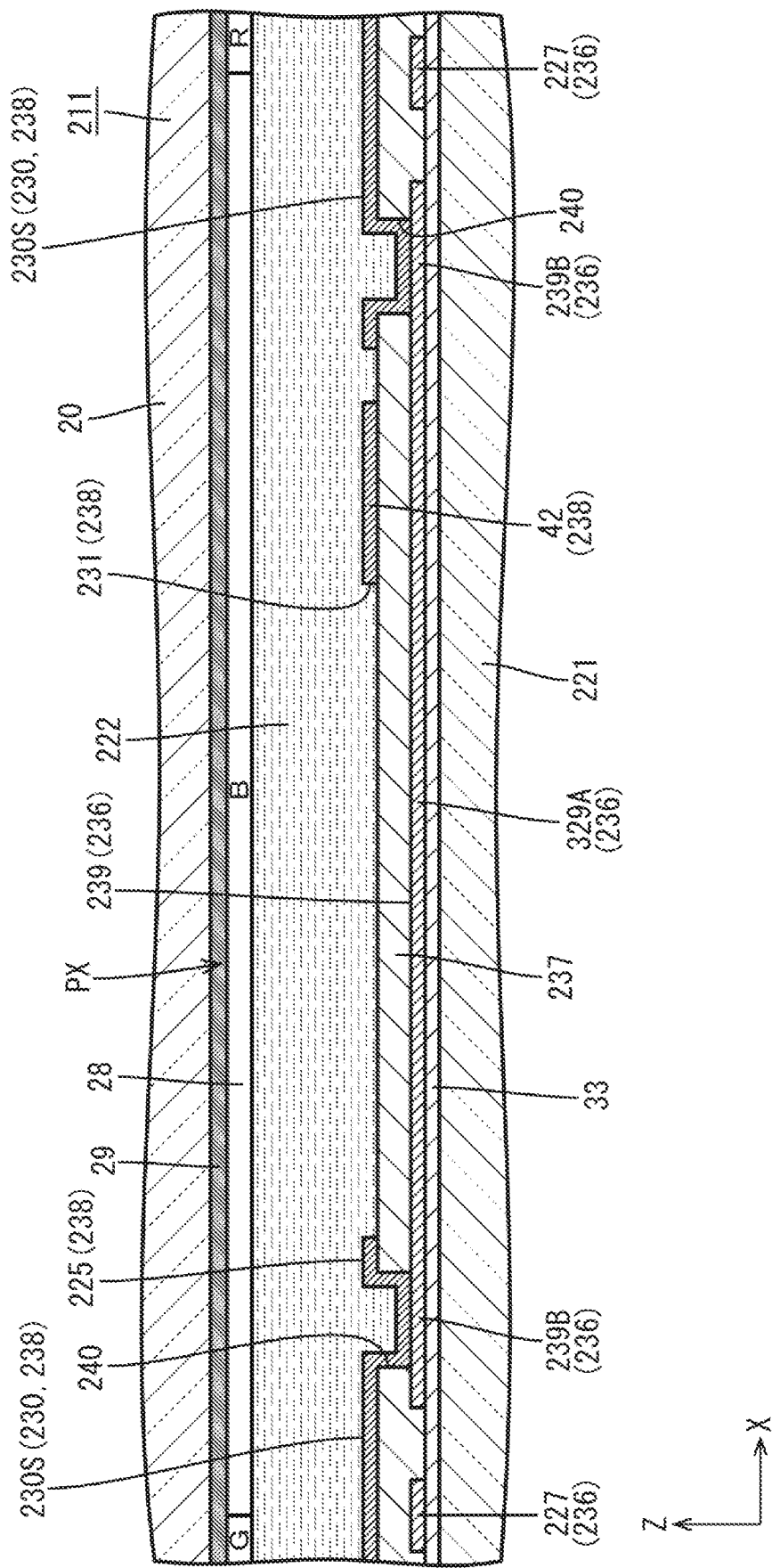
FIG. 14 is a cross-sectional view of the liquid crystal panel illustrated in FIG. 12 taken along line C-C.

Each of the divided touch electrodes 230S according to the present embodiment has an extension electrode 41 that runs laterally across the source wire 227 as illustrated in FIGS. 10 and 11. Out of the pair of divided touch electrodes 230S adjacent to each other with the source wire 227 therebetween, the extension electrode 41 runs laterally across one divided touch electrode 230S (the right side in FIGS. 10 and 11) to the source wire 227 and extends toward the other divided touch electrode 230S (the left side in FIGS. 10 and 11). FIG. 12 is an enlarged planar view of the TFTs 223 and their surroundings on the array substrate 221, and FIG. 13 is an enlarged planar view of the connection part 239 and its surroundings in the pattern of the second transparent electrode film 238 on the array substrate 221. FIG. 13 illustrates the patterns of the first metallic film 232 and the second metallic film 236 by two-dot chain lines. FIG. 14 is a cross-sectional view of the connection part 239, the extension electrode 41, and their surroundings in a liquid crystal panel 211. As illustrated in FIGS. 12 to 14, each of the extension electrodes 41 overlaps part of the connection part 239 overlapping the other divided touch electrode 230S. Specifically, out of the pair of electrode contact portions 239B in each of the connection parts 239, one electrode contact portion 239B is overlapped with the extension electrode 41 of one divided touch electrode 230S, the other electrode contact portion 239B overlaps the extension electrode 41 of the other divided touch electrode 230S, and they are connected together through a contact hole 240. Each of the contact holes 240 is formed in an inter-layer insulation film 237 that is interposed between the second metallic film 236 constituting the connection parts 239 and the second transparent electrode film 238 constituting the divided touch electrodes 230S. Accordingly, each of the connection parts 239 disposed on the same layer as the source wires 227 allows connection of the pair of divided touch electrodes 230S adjacent to each other with the source wire 227 therebetween. Each of the connection parts 239 according to the present embodiment is not limited to the connection part that connects the pair of divided touch electrodes 230S adjacent to each other with the source wire 227 therebetween as described above but may connect two different portions of one divided touch electrode 230S as seen in the X-axis direction. Specifically, some of the divided touch electrodes 230S may have a formation range across the source wire 227 as seen in the X-axis direction. Each of the connection parts 239 to be connected to those divided touch electrodes 230S may connect two different portions of one divided touch electrode 230S as seen in the X-axis direction. Providing the connection parts 239 equalizes the parasitic capacitances between the connection parts 239 and the pixel electrodes 224 in the individual pixels, which produces the effect of making display defects unlikely to occur as compared to the case where the connection parts 239 are not provided. Each of the touch wires 231 is mostly overlapped with the source wire 227 but partially constitutes a bend portion 42 that bends bypassing the extension electrode 41. The bend portion 42 is interposed between the extension electrode 41 and the other divided touch electrode 230S. The other divided touch electrode 230S is cut in the arrangement area of the extension electrode 41 and the bend portion 42. When each of the connection parts is arranged in such a manner as to run laterally across the touch wire 231 in a space produced by providing a bend portion in the source wire, it is necessary to cut the pixel electrode on the same layer in the arrangement range of the bent portion of the source wire. In this regard, in the present embodiment, each of the divided touch electrodes 230S has the extension electrode 41 and each of the touch wires 231 has the bend portion 42, which eliminates the need to cut the pixel electrode 224.

Fourth Embodiment

A fourth embodiment of the technology described herein will be described with reference to FIGS. 15 to 17. In the fourth embodiment, touch electrodes 330 and touch wires 331 are changed in configuration from those in the first embodiment. Duplicated descriptions of the same structures, operations, and effects as those of the first embodiment will be omitted.

Figure 15:
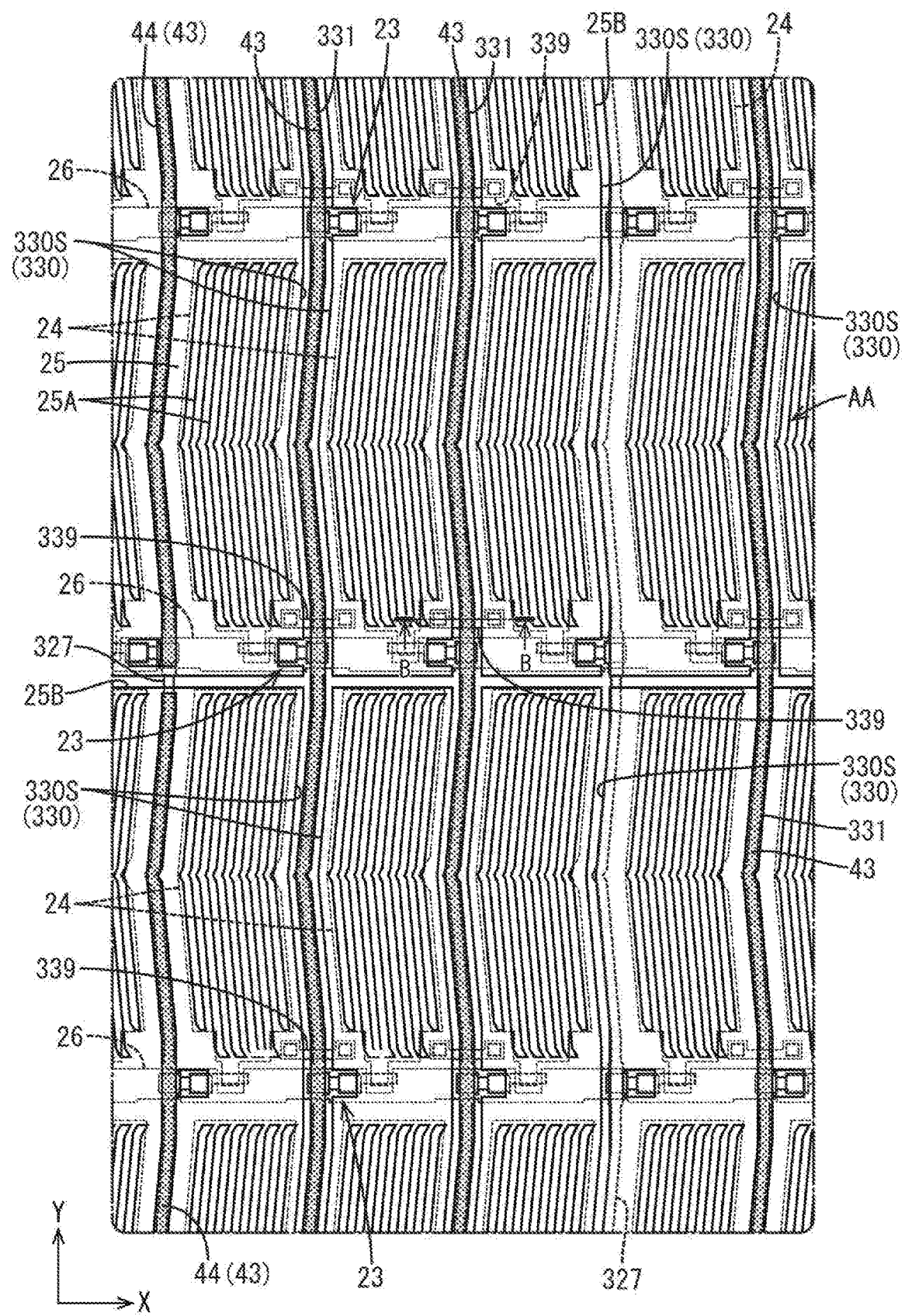
FIG. 15 is a planar view of a pixel array in an array substrate constituting a liquid crystal panel according to a fourth embodiment of the technology described herein.
Figure 16:
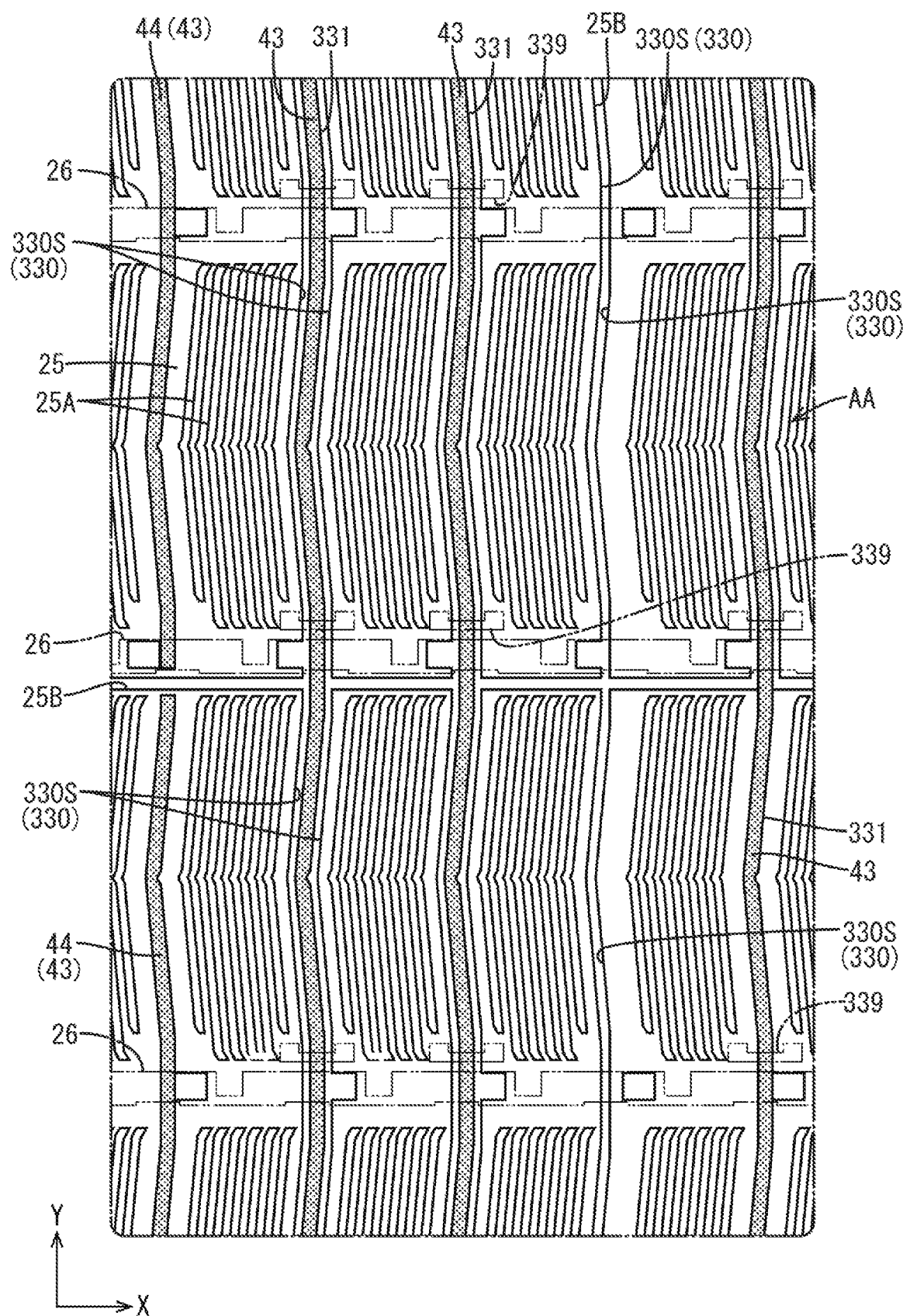
FIG. 16 is a planar view of a pattern of a second transparent electrode film on the array substrate constituting the liquid crystal panel.
Figure 17:
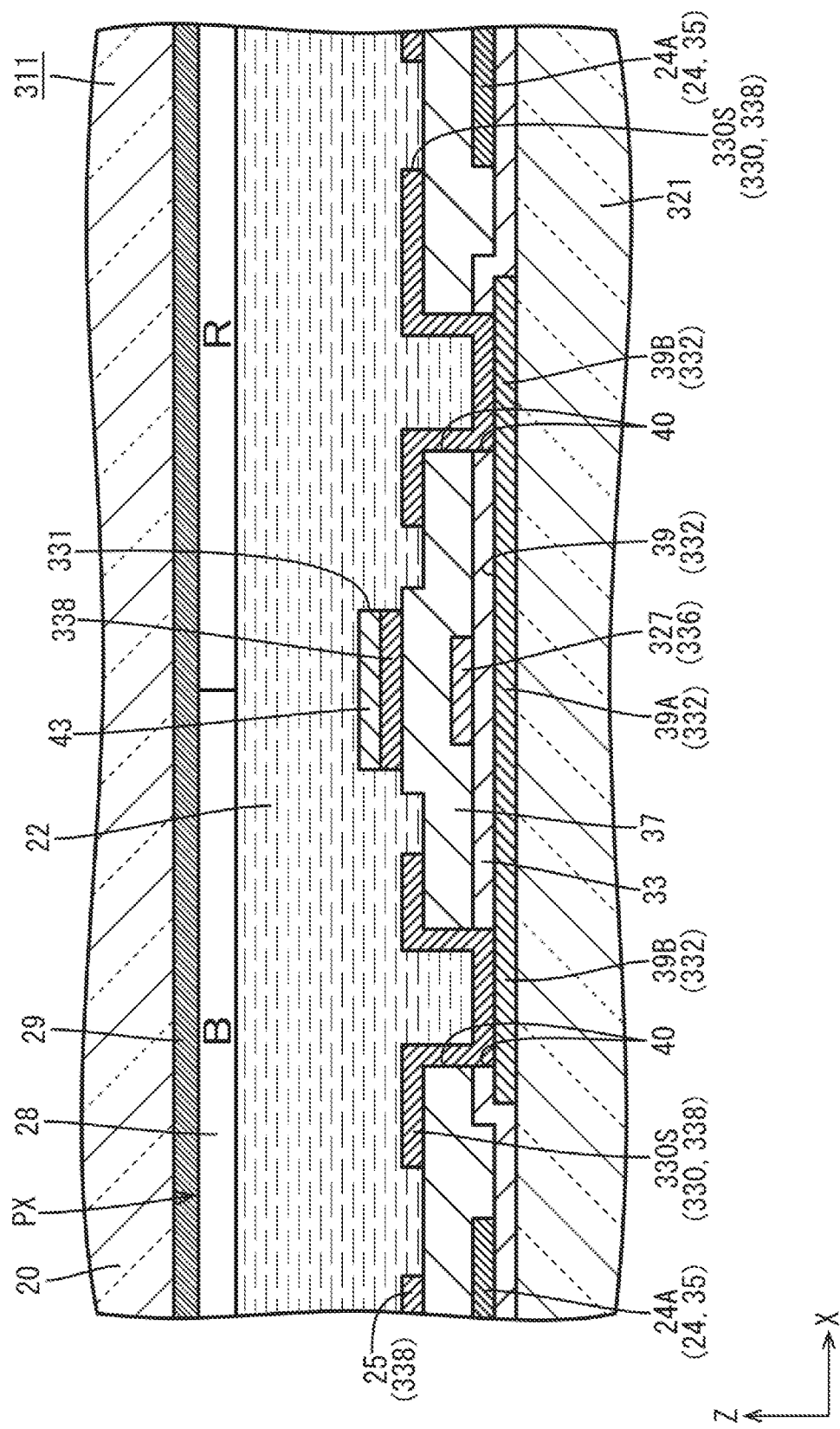
FIG. 17 is a cross-sectional view of the liquid crystal panel illustrated in FIG. 15 taken along line B-B.

FIG. 15 is a planar view of a display area AA on an array substrate 321, and FIG. 16 is a planar view of a pattern of a second transparent electrode film 338 on the array substrate 321. FIGS. 15 and 16 illustrate a third metallic film 43 described later in a shaded manner. In addition, FIG. 16 illustrates a pattern of a first metallic film 332 by two-dot chain lines. FIG. 17 is a cross-sectional view of a connection part 339 and its surroundings on a liquid crystal panel 311. Touch wires 331 according to the present embodiment are formed from the second transparent electrode film 338 and a third metallic film (metallic film) 43 stacked on the top of the second transparent electrode film 338 as illustrated in FIGS. 15 to 17. The third metallic film 43 is a single-layer film formed from one kind of metallic material or a multi-layer-film or alloy formed from different kinds of metallic materials as with the first metallic film 332 and the second metallic film 336. Accordingly, the wire resistance of the touch wires 331 decreases as compared to the case where the touch wires are formed from only the second transparent electrode film 338 as in the first embodiment. This improves the position detection sensitivity and the display quality.

Divided touch electrodes 330S constituting the touch electrode 330 are formed from the second transparent electrode film 338 and the third metallic film 43 as illustrated in FIGS. 15 and 16. Specifically, each of the divided touch electrodes 330S constituting the touch electrode 330 has a transparent electrode film portion (not illustrated) formed from the second transparent electrode film 338 and a metallic film portion 44 formed from the third metallic film 43. The transparent electrode film portions are formed in the same range as the touch electrodes described above in relation to the first embodiment, whereas the metallic film portions 44 are selectively disposed in only a formation range overlapping source wires 327. The third metallic film 43 is higher in electrical conductivity and is lower in electrical resistance than the second transparent electrode film 338. Therefore, as compared to the case where the touch electrodes are formed from only the second transparent electrode film 338 as in the first embodiment, the wire resistance of the touch electrodes 330 decreases due to the installation of the metallic film portion 44. This improves the position detection sensitivity and the display quality. In addition, out of the touch electrodes 330, the metallic film portions 44 formed from the third metallic film 43 are selectively disposed in such a manner as to overlap the source wires 327. This avoids decrease in the aperture ratio caused by the light-shielding metallic film portions 44.

Other Embodiments

The technology described herein is not limited to the embodiments described above and with reference to the drawings. The following embodiments may be included in the technical scope.

(1) In the foregoing embodiments, the extension portions of the connection parts extend linearly along the X-axis direction. Alternatively, the extension portions may extend obliquely with respect to the X-axis direction. In addition, the extension portions may be flat-shaped with a bend in the middle.

(2) In the foregoing embodiments, the electrode contact portions of the connection parts have a square flat shape. However, the planar shape of the electrode contact portions can be changed as appropriate to rectangle, triangle, pentagon and other polygons, circle, oval, and others, for example.

(3) In the foregoing embodiments, the connection parts are formed from the first metallic film or the second metallic film. For example, when a metallic film is provided under the first metallic film constituting the gate wires or the like with an insulation film therebetween, the connection parts can be formed from the metallic film below the first metallic film.

(4) In the foregoing embodiments, the number of the touch wires is smaller than the number of the source wires. Alternatively, the number of the touch wires may be the same as the number of the source wires.

(5) In the configurations of the first and fourth embodiments, the arrangement of the connection parts as seen in the Y-axis direction can be the same as those in the second and third embodiments.

(6) Besides those in the foregoing embodiments, the specific planar arrangement and formation range of the connection parts can be changed as appropriate.

(7) In the second embodiment, the connection parts run laterally across substantially the entire touch electrodes. Alternatively, the connection parts can run across three or more divided touch electrodes (two or more touch wires) such that their extension length does not reach the entire length of the touch electrodes. In this case, a plurality of connection parts is aligned along the X-axis direction in one touch electrode.

(8) In the third embodiment, the divided touch electrodes have the extension electrodes, and the touch wires have the bent portions. Alternatively, the connection parts can run laterally across the touch wires in spaces produced by providing the bend portions in the source wires, for example. In that case, the extension electrodes of the divided touch electrodes and the bend portions of the touch wires can be omitted.

(9) The configuration of the fourth embodiment can be combined with the configurations in the second and third embodiments.

(10) Besides those in the foregoing embodiments, the specific screen size of the liquid crystal panel can be changed as appropriate. In particular, in the fourth embodiment, the resistance of the touch electrodes is decreased. Accordingly, the fourth embodiment is suitably applicable to liquid crystal panels of large screen sizes such as 32 inches or the like.

(11) Besides those in the foregoing embodiments, the specific pitch of the pixel portions on the liquid crystal panel can be changed as appropriate.

(12) In the foregoing embodiments, one driver is mounted on the array substrate. Alternatively, a plurality of drivers may be mounted on the array substrate.

(13) In the foregoing embodiments, the gate circuit portion is provided on the array substrate. Alternatively, the gate circuit portion may be omitted such that a gate driver having the same function as that of the gate circuit portion may be mounted on the array substrate.

(14) In addition to the foregoing embodiments, an inspection circuit may be provided on the array substrate to inspect the wires for disconnection and the like. The inspection circuit may be arranged in the mounting area of the driver on the array substrate or may be arranged near the display area so as not to overlap the driver.

(15) Besides those in the foregoing embodiments, the specific planar shape of the pixel overlapping opening portions in the common electrode can be changed as appropriate. The planar shape of the pixel overlapping opening portions can be a V shape or a linear shape, for example. In addition, the specific number of the pixel overlapping opening portions can be changed as appropriate.

(16) In the foregoing embodiments, the TFTs are flatly arranged in a zigzag pattern on the array substrate. Alternatively, the TFTs may be flatly arranged in a matrix.

(17) In the foregoing embodiments, the drain electrodes of the TFTs s and the pixel electrodes are formed on the gate insulation film. However, there is no limitation on the stacking order. The drain electrodes of the TFTs may be on the top of the pixel electrodes or the reverse.

(18) In the foregoing embodiments, the light-shield portions are provided on the CF substrate. Alternatively, the light-shield portions may be provided on the array substrate.

(19) Besides those in the foregoing embodiments, the semiconductor film constituting the channel portions of the TFTs may be formed from polysilicon. In that case, the TFTs are preferably formed of bottom-gate type.

(20) In the foregoing embodiments, the touch panel pattern is a self-capacitance type. Alternatively, the touch panel pattern may be a mutual-capacitance type.

(21) In the foregoing embodiments, a transmissive liquid crystal panel is taken as an example. However, the technology described herein is also applicable to a reflective liquid crystal panel and a semi-transmissive liquid crystal panel.

(22) In the foregoing embodiments, the liquid crystal display device (liquid crystal panel and backlight device) has the planar shape of a horizontally oriented rectangle. Alternatively, the liquid crystal display device may have the planar shape of a vertically oriented rectangle, square, circle, semicircle, long circle, oval, trapezoid, or the like.

(23) In the foregoing embodiments, the liquid crystal panel is configured such that the liquid crystal layer is sandwiched between the pair of substrates. However, the technology described herein is also applicable to display panels in which functional organic molecules other than the liquid crystal material are sandwiched between the pair of substrates.

The invention claimed is:

1. A display device with a position input function comprising:
pixel electrodes arranged at an interval;
a position detection wire disposed between the pixel electrodes adjacent to each other and included in a layer different from a layer of the pixel electrodes;
a position detection electrode forming a capacitance between the position detection electrode and a positional input body performing a positional input and detecting an input position by the positional input body, the position detection electrode being included in a layer same as that of the position detection wire and connected to the position detection wire, and the position detection electrode overlapping the pixel electrodes and being divided into divided position detection electrodes by the position detection wire; and
a connection part included in a layer different from the layer of the position detection electrode and the position detection wire while having an insulation film therebetween, the connection part including a portion thereof overlapping a portion of each of the divided position detection electrodes and being connected to the divided position detection electrodes through a contact hole formed in the insulation film.

2. The display device with a position input function according to claim 1, further comprising signal wires that transmits a signal to be supplied to the pixel electrodes, wherein
the signal wires include a signal wire overlapping the position detection wire in a layer different from the layer of the position detection wire.

3. The display device with a position input function according to claim 2, wherein the signal wires are included in a same layer as the pixel electrodes.

4. The display device with a position input function according to claim 2, further comprising:
a switching element connected to the signal wires and the pixel electrodes; and
a scanning wire connected to the switching element to transmit a signal for driving the switching element and included in a layer different from the layer of the signal wires, wherein
the position detection electrode includes position detection electrodes that are arranged at an interval along at least an extending direction of the position detection wire, and
the connection part has an extension portion that extends along a direction crossing the extending direction of the position detection wire and is disposed between the position detection electrodes adjacent to each other.

5. The display device with a position input function according to claim 4, wherein
the position detection electrodes have a formation range across the signal wires, and
the connection part is included in a layer different from the layer of the signal wires such that the extension portion crosses the signal wires.

6. The display device with a position input function according to claim 5, wherein the connection part is included in a same layer as the scanning wire such that the extension portion is interposed between the scanning wire and the pixel electrodes.

7. The display device with a position input function according to claim 2, wherein the connection part is included in a layer different from the layer of the signal wires and crosses the signal wires.

8. The display device with a position input function according to claim 7, further comprising:
a switching element connected to the signal wires and the pixel electrodes; and
a scanning wire connected to the switching element to transmit a signal for driving the switching element and included in a layer different from the layer of the signal wires, wherein
the connection part is included in a same layer as the scanning wire.

9. The display device with a position input function according to claim 2, wherein
the connection part is included in a same layer as the signal wires, and
a pair of the divided position detection electrodes adjacent to each other has the signal wire therebetween and one of the pair of the divided position detection electrodes has an extension electrode that crosses the signal wire and extends toward another one of the pair of the divided position detection electrodes and overlaps a part of the connection part overlapping the other divided position detection electrode.

10. The display device with a position input function according to claim 9, further comprising:
a switching element connected to the signal wires and the pixel electrodes; and
a scanning wire connected to the switching element to transmit a signal for driving the switching element, wherein
the signal wires and the connection part are included in a layer different from the layer of the scanning wire.

11. The display device with a position input function according to claim 1, wherein the position detection electrodes are at least partially formed from a transparent electrode film, and the position detection wire is formed from the transparent electrode film and a metallic film overlapping the transparent electrode film.

12. The display device with a position input function according to claim 11, wherein the position detection electrodes are formed from the transparent electrode film and the metallic film, and a metallic film portion formed from the metallic film selectively overlaps the signal wires.

\* \* \* \* \*